(12) United States Patent
Holt

(10) Patent No.: US 8,122,198 B2
(45) Date of Patent: *Feb. 21, 2012

(54) MODIFIED MACHINE ARCHITECTURE WITH PARTIAL MEMORY UPDATING

(75) Inventor: John M. Holt, Essex (GB)

(73) Assignee: Waratek Pty Ltd., Lindfield, NSW (AU)

( * ) Notice: Subject to any disclaimer, the term of this patent is extended or adjusted under 35 U.S.C. 154(b) by 877 days.

This patent is subject to a terminal disclaimer.

(21) Appl. No.: 12/011,207

(22) Filed: Jan. 23, 2008

(65) Prior Publication Data

US 2008/0215703 A1    Sep. 4, 2008

Related U.S. Application Data

(62) Division of application No. 11/583,958, filed on Oct. 18, 2006, now Pat. No. 7,660,960.

(60) Provisional application No. 60/730,543, filed on Oct. 25, 2005.

(51) Int. Cl.
*G06F 12/00* (2006.01)

(52) U.S. Cl. ......... 711/147; 711/148; 711/170; 711/221

(58) Field of Classification Search ........................ None
See application file for complete search history.

(56) References Cited

U.S. PATENT DOCUMENTS

| | | |
|---|---|---|
| 4,969,092 A | 11/1990 | Shorter |
| 5,214,776 A | 5/1993 | Bagnoli et al. |
| 5,291,597 A | 3/1994 | Shorter |
| 5,418,966 A | 5/1995 | Madduri |

(Continued)

FOREIGN PATENT DOCUMENTS

EP    0969377    1/2000

(Continued)

OTHER PUBLICATIONS

Abdullahi, et al., "Garbage Collection for Internet: A Survey of Distributed Garbage Collection", ACM Computing Surveys [Online], vol. 30, No. 3, Sep. 1998, pp. 330-373, XP002504741 ISSN:0360-0300 Retrieved from the Internet URL:http://portal.acm.org/citation.cfm?doid=292469.292471>.

(Continued)

*Primary Examiner* — Shawn X Gu
(74) *Attorney, Agent, or Firm* — Pillsbury Winthrop Shaw Pittman LLP

(57) ABSTRACT

The updating of only some memory locations in a multiple computer environment in which at least one applications program (50) executes simultaneously on a plurality of computers M1, M2 . . . Mn each of which has a local memory, is disclosed. Memory locations (A, B, D, E, X) in said local memory are categorized into two groups. The first group of memory locations (X1, X2, . . . Xn, A1, A2 . . . An) are each accessible by other computers. The second group of memory locations (B, E) are each accessible only by the computer having the local memory including the memory location. Changes to the values of memory locations in the first group only are transmitted to all other computers. A promotion mechanism is disclosed to promote memory locations in the second group into the first group in the event that application program execution means that a memory location in said second group is referred to by a memory location in the first group (ie the first group location now points to the second group location).

115 Claims, 14 Drawing Sheets

U.S. PATENT DOCUMENTS

| | | | |
|---|---|---|---|
| 5,434,994 | A | 7/1995 | Shaheen et al. |
| 5,488,723 | A | 1/1996 | Baradel et al. |
| 5,544,345 | A | 8/1996 | Carpenter et al. |
| 5,568,609 | A | 10/1996 | Sugiyama et al. |
| 5,612,865 | A | 3/1997 | Dasgupta |
| 5,802,585 | A | 9/1998 | Scales et al. |
| 5,918,248 | A | 6/1999 | Newell et al. |
| 6,049,809 | A | 4/2000 | Raman et al. |
| 6,148,377 | A * | 11/2000 | Carter et al. .................. 711/147 |
| 6,163,801 | A | 12/2000 | O'Donnell et al. |
| 6,192,514 | B1 | 2/2001 | Lurndal |
| 6,314,558 | B1 | 11/2001 | Angel et al. |
| 6,324,587 | B1 | 11/2001 | Trenbeath et al. |
| 6,327,630 | B1 | 12/2001 | Carroll et al. |
| 6,370,625 | B1 | 4/2002 | Carmean et al. |
| 6,389,423 | B1 | 5/2002 | Sakakura |
| 6,425,016 | B1 | 7/2002 | Banavar et al. |
| 6,571,278 | B1 | 5/2003 | Negishi et al. |
| 6,574,628 | B1 | 6/2003 | Kahn et al. |
| 6,574,674 | B1 | 6/2003 | May et al. |
| 6,611,955 | B1 | 8/2003 | Logean et al. |
| 6,625,751 | B1 | 9/2003 | Starovic et al. |
| 6,668,260 | B2 | 12/2003 | Zoltan |
| 6,757,896 | B1 | 6/2004 | Cohen et al. |
| 6,760,903 | B1 | 7/2004 | Morshed et al. |
| 6,775,831 | B1 | 8/2004 | Carrasco et al. |
| 6,779,093 | B1 | 8/2004 | Gupta |
| 6,782,492 | B1 * | 8/2004 | Nakaso ............................ 714/42 |
| 6,823,511 | B1 | 11/2004 | McKenney et al. |
| 6,862,608 | B2 | 3/2005 | Buhlman et al. |
| 6,954,794 | B2 | 10/2005 | Rudd et al. |
| 6,968,372 | B1 | 11/2005 | Thompson et al. |
| 7,010,576 | B2 | 3/2006 | Bae |
| 7,020,736 | B1 | 3/2006 | Cherukuri |
| 7,031,989 | B2 | 4/2006 | Elmendorf et al. |
| 7,047,341 | B2 | 5/2006 | Jung |
| 7,047,521 | B2 | 5/2006 | Bunnell |
| 7,058,826 | B2 | 6/2006 | Fung |
| 7,082,604 | B2 | 7/2006 | Schneiderman |
| 7,206,827 | B2 | 4/2007 | Viswanath et al. |
| 7,581,069 | B2 * | 8/2009 | Holt ............................ 711/147 |
| 7,660,960 | B2 * | 2/2010 | Holt ............................ 711/165 |
| 2002/0199172 | A1 | 12/2002 | Bunnel |
| 2003/0004924 | A1 | 1/2003 | Williams |
| 2003/0005407 | A1 | 1/2003 | Hines |
| 2003/0067912 | A1 | 4/2003 | Mead et al. |
| 2003/0105816 | A1 | 6/2003 | Goswani |
| 2004/0073828 | A1 | 4/2004 | Bronstein |
| 2004/0093588 | A1 | 5/2004 | Gschwind et al. |
| 2004/0158819 | A1 | 8/2004 | Cuomo et al. |
| 2004/0163077 | A1 | 8/2004 | Dimpsey et al. |
| 2005/0039171 | A1 | 2/2005 | Avakian et al. |
| 2005/0086384 | A1 | 4/2005 | Ernst |
| 2005/0108481 | A1 | 5/2005 | Iyengar et al. |
| 2005/0240737 | A1 | 10/2005 | Holt |
| 2005/0257219 | A1 | 11/2005 | Holt |
| 2005/0262313 | A1 | 11/2005 | Holt |
| 2005/0262513 | A1 | 11/2005 | Holt |
| 2006/0020913 | A1 | 1/2006 | Holt |
| 2006/0080389 | A1 | 4/2006 | Powers et al. |
| 2006/0095483 | A1 | 5/2006 | Holt |
| 2006/0143350 | A1 | 6/2006 | Miloushev et al. |
| 2006/0167878 | A1 | 7/2006 | Hartman |
| 2006/0242464 | A1 | 10/2006 | Holt |
| 2006/0253844 | A1 | 11/2006 | Holt |
| 2006/0265703 | A1 | 11/2006 | Holt |
| 2006/0265704 | A1 | 11/2006 | Holt |
| 2006/0265705 | A1 | 11/2006 | Holt |
| 2008/0072238 | A1 | 3/2008 | Monnie et al. |
| 2008/0189700 | A1 | 8/2008 | Schmidt et al. |

FOREIGN PATENT DOCUMENTS

| | | |
|---|---|---|
| WO | WO95/08809 | 3/1995 |
| WO | WO98/58330 | 12/1998 |
| WO | WO02/44835 * | 6/2002 |
| WO | WO03/083614 * | 10/2003 |
| WO | WO03084116 | 10/2003 |
| WO | WO2005/103924 * | 11/2005 |
| WO | WO2005/103925 * | 11/2005 |
| WO | WO2005/103926 * | 11/2005 |
| WO | WO2005/103927 * | 11/2005 |
| WO | WO2005/103928 * | 11/2005 |
| WO | WO2006/110937 * | 10/2006 |
| WO | WO2006/110957 * | 10/2006 |

OTHER PUBLICATIONS

Aridor, et al. "cJVM: a single System Image of a JVM on a Cluster" Proceedings of the International Conference on Parallel Processing, pp. 21-24, Sep. 21-24, 1999.

Bal, et al., "A Distributed Implementation of the Shared Data-Object Model", Proc. USENIX Workshop on Experiences with Distributed and Multiprocessor Systems pp. 1-19 , Oct. 1998, Fort Lauderdale, FL.

Bal, et al., "Experience with Distributed Programming in Orca", *IEEE CS International Conference on Computer Languages*, pp. 1-23 , Mar. 1990, New Orleans, Louisiana.

Bal, et al., "Object Distribution in ORCA Using Compile-Time and Run-Time Techniques", Proc. Conference on Object-Oriented Programming Systems, Languages and Applications pp. 162-177, Sep. 26, 1993-Oct. 1, 1993.

Bal, et al., "Orca: A Language for Paralell Programming of Distributed Systems", *IEEE Transactions on Software Engineering*, 18(3): pp. 1-33, Oct. 1989.

Bal, et al., "Replication Techniques for Speeding Up Parallel Applications On Distributed Systems", *Concurrency Practice & Experience*, 4(5):337-355 (1992).

Bellew, et al., "Update propagation in distributed memory hierarchy." Data Engr. 1990. Proc. 6th Int'l Conf., pp. 521-528, Feb. 1990.

Bennett, et al. "Munin: Distributed Shared Memory Based on Type Specific Memory Coherence." Dept. Elec & Computer Engr. pp. 1-9 ACM, PPOPP' 90, Feb. 1990.

Bressoud, T.C. TFT: "A Software System for Application—Transparent Fault Tolerance. Proc.", 28th Annual International Symposium on Fault-Tolerant Computing, pp. 128-137, Jun. 1998, Munich, Germany.

Chen, et al., "Multi-Jav: a distributed shared memory system based on multiple Java virtual machines." Proc. Of Conf. on Parallel & Distrib. Proc. Techn. & Appls., Las Vegas, NV, Jun. 1998.

Dasilva, et al. "An evaluation of cJava system architecture." IEEE Prc. 15th Symposium on Computer Architecture & High Performance Computing, pp. 1-9 , Nov. 10-12, 2003, San Paulo, Brazil.

Dmitriev, "Profiling Java applications using code hotswapping and dynamic call graph revelation.", Jan. 14-16, 2004, ACM WOSP '04, pp. 139-150.

Dwarkadas, et al., "Evaluation of Release Consistent Software Distributed Shared Memory on Emerging Network Technology", Proc of the 20th Annual International Symposium on Computer Architecture (ISCA'93), pp. 144-155, May 16-19, 1993, San Diego, CA.

Goethe, et al. "The Distributed Ada Run-Time System DARTS." Software Prac. & Experience, vol. 21, No. 1, pp. 1249-1263, Aug. 4, 1989.

Haumacher, et al. "Transparent distributed threads for Java," Parallel & Distributed Proc. Symposium 2003. Proc. Int'l. pp. 22-26, Apr. 2003.

Puatu, "Distributed Garbage Collection of Active Objects with No Global Synchronisation"—Lecture Notes in Computer Science, Memory Management [online], XP008098868 ISSN: 0302-9743 ISBN: 978-3-540-55940-5- Retreived from the Internet URL:http//www.springerlink.com/content/5v 028411810p6m700/> ,vol. 637, pp. 148-1694 Sep. 17-19, 1992, IWMM 92, St. Malo, France.

Larus, et al. "EEL: machine-independent executable editing. 1995 ACM SIGGPLAN '95." pp. 291-300 Jun. 21-22, 1995.

Little, et al., "Maintaining Information About Persistent Replicated Objects in a Distributed System", Processing of the International Conference on Distributed Computing Systems. Pittsburgh, May 25-28 1993 [Proceedings of the International Conference on Distributed Computing Systems], Los Alamitos, IEEE Comp Soc Press US, vol. CONF. 13, May 25, 1993, pp. 491-498, WP010095684 ISBN:978-0-8186-3770-4.

Radovic, et al., "Removing the overhead from software-based shared memory." Prc. 2001 ACM/IEEE Conf. Supercomputing (CDrom), Denver CO, Nov. 10-16, 2001, Supercomuting '01. ACM Press. NY.

Russ, et al. "The hector distributed run-time environment", IEEE Transactions on Parallel and Distributed Systems, vol. 9, No. 111998, May 22, 1998.

Sanchez, et al. "Distributed Garbage Collection for Wide Area Replicated Memory", Proceedings of the 6th Conference on Usenix Conference on Object-Orientated Technologies and Systems [On Line], vol. 6, Jun. 29, 2001, pp. 1-14, P1-14XP002502672 Retrieved from the Internet URL:http://portal.acm.org/citation.cfm?id=1268246 http://citeseerx.ist.psu.edu/viewdoc/summary?doi=10.1.1.10.5675 http://www.gsd.inesc-id.pt/{veiga/papers/dgcwarm-coots-2001.pdf>.

Shapiro, et al., "A Distributed Shared Memory and its Garbage Collector", Lecture notes in Computer Science, vol. 972, Proceedings of the 9th International Workshop on Distributed Algorithms, pp. 198-214, Sep. 13-15, 1995.

Supplementary European Search Report EP 06 79 0317 Dated Mar. 5, 2009.

* cited by examiner

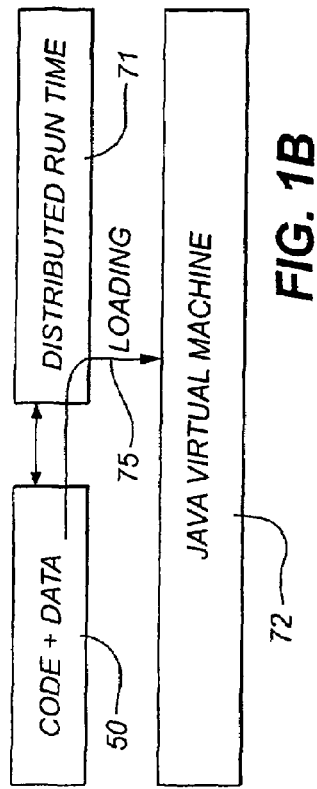
FIG. 1A
PRIOR ART
FIG. 1B
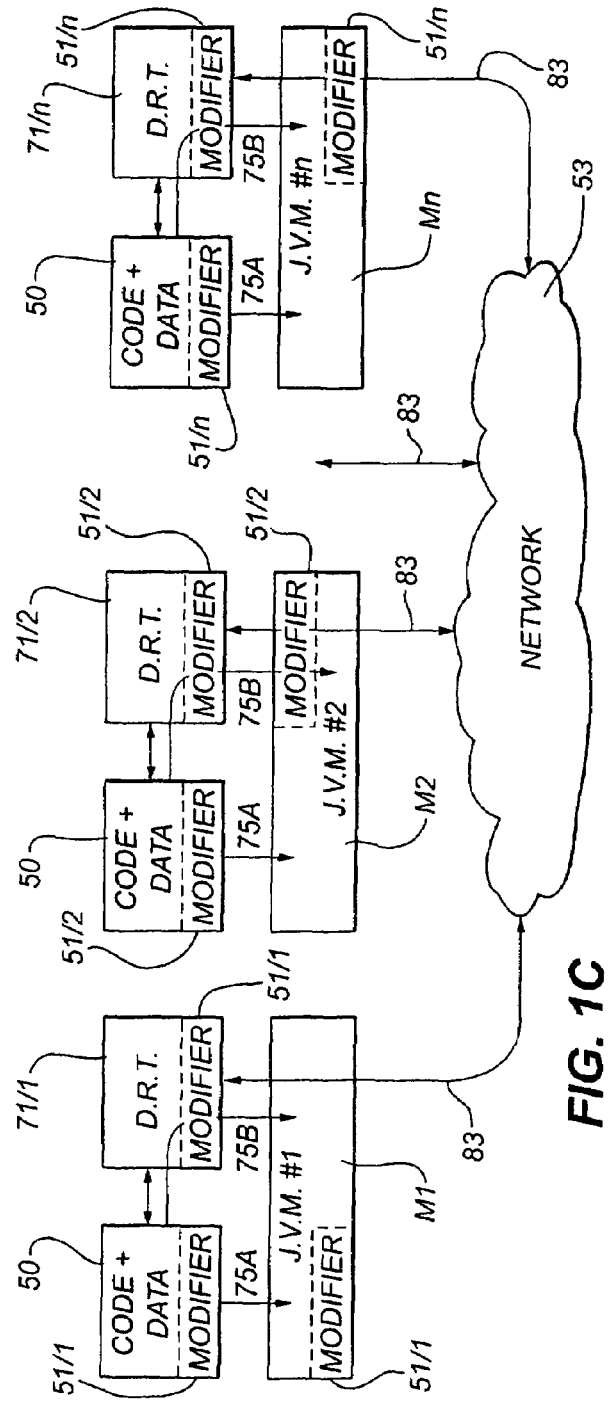
FIG. 1C

| LOCATION | MACHINE | | | | |
|---|---|---|---|---|---|
| A | | | | | n |
| B | 1 | | | | |
| ⋮ | | | | | |
| D | | 2 | | | |
| E | | | | | n |
| ⋮ | | | | | |
| | | | | | |
| | | | | | |
| X | 1 | 2 | | | n |

| LOCATION | MACHINE | | | | | |
|---|---|---|---|---|---|---|
| A | 1 | 2 | | | --- | n |
| B | 1 | | | | --- | |
| ⋮ | | | | | --- | |
| D | | 2 | | | --- | |
| E | | | | | --- | n |
| ⋮ | | | | | --- | |
| | | | | | --- | |
| ⋮ | | | | | --- | |
| X | 1 | 2 | | | --- | n |

MACHINE | TABLE

M1

| X1 | 1 | 2 |  |  | n |
|----|---|---|--|--|---|
| B  | 1 |   |  |  |   |

M2

| X2 | 1 | 2 |  |  | n |
|----|---|---|--|--|---|
| D  |   | 2 |  |  |   |

Mn

| Xn | 1 | 2 |  |  | n |
|----|---|---|--|--|---|
| E  |   |   |  |  | n |
| A  |   |   |  |  | n |

FIG. 11

MACHINE | TABLE

M1

| X1 | 1 | 2 |  |  | n |
|----|---|---|--|--|---|
| B  | 1 |   |  |  |   |
| A1 | 1 | 2 |  |  | n |

M2

| X2 | 1 | 2 |  |  | n |
|----|---|---|--|--|---|
| D  |   |   |  |  |   |
| A2 | 1 | 2 |  |  | n |

Mn

| Xn | 1 | 2 |  |  | n |
|----|---|---|--|--|---|
| E  |   |   |  |  |   |
| An | 1 | 2 |  |  | n |

| MACHINE | TABLE | | | | | |
|---|---|---|---|---|---|---|
| M1 | X1 | 1 | 2 | | | n |
|    | B  | 1 |   | | |   |

| M2 | X2 | 1 | 2 | | | n |
|---|---|---|---|---|---|---|
|    | D  |   | 2 | | |   |

| Mn | Xn | 1 | 2 | | | n |
|---|---|---|---|---|---|---|
|    | E  |   |   | | | n |
|    | A  |   |   | | | n |
|    | K  |   |   | | | n |

FIG. 14

| MACHINE | TABLE | | | | | |
|---|---|---|---|---|---|---|
| M1 | X1 | 1 | 2 | | | n |
|    | B  | 1 |   | | |   |
|    | A1 | 1 | 2 | | | n |
|    | K1 | 1 | 2 | | | n |

| M2 | X2 | 1 | 2 | | | n |
|---|---|---|---|---|---|---|
|    | D  |   | 2 | | |   |
|    | A2 | 1 | 2 | | | n |
|    | K2 | 1 | 2 | | | n |

| Mn | Xn | 1 | 2 | | | n |
|---|---|---|---|---|---|---|
|    | E  |   |   | | | n |
|    | An | 1 | 2 | | | n |
|    | Kn | 1 | 2 | | | n |

| LOCATION | MACHINE | | | | | |
|---|---|---|---|---|---|---|
| A | 1 | 2 | | | | |
| B | 1 | | | | | |
| ⋮ | | | | | | |
| D | 1 | 2 | | | | |
| E | | | | | | n |
| ⋮ | | | | | | |
| ⋮ | | | | | | |
| ⋮ | | | | | | |
| X | 1 | 2 | | | | n |

FIG. 19

MACHINE      TABLE

M1

| X1 | 1 | 2 | | | n |
|---|---|---|---|---|---|
| B | 1 | | | | |
| A1 | 1 | 2 | | | |
| D1 | 1 | 2 | | | |

M2

| X2 | 1 | 2 | | | n |
|---|---|---|---|---|---|
| D2 | 1 | 2 | | | |
| A2 | 1 | 2 | | | |

Mn

| Xn | 1 | 2 | | | n |
|---|---|---|---|---|---|
| E | | | | | n |

FIG. 20

| LOCATION | MACHINE | | | | | |
|---|---|---|---|---|---|---|
| A | 1 | 2 | | | | n |
| B | 1 | | | | | |
| ⋮ | | | | | | |
| D | 1 | 2 | | | | n |
| E | | | | | | n |
| | | | | | | |
| ⋮ | | | | | | |
| | | | | | | |
| X | 1 | 2 | | | | n |

| MACHINE | | | TABLE | | | |
|---|---|---|---|---|---|---|
| | X1 | 1 | 2 | | | n |
| M1 | B | 1 | | | | |
| | A1 | 1 | 2 | | | n |
| | D1 | 1 | 2 | | | n |
| | | | | | | |
| | X2 | 1 | 2 | | | n |
| M2 | D2 | 1 | 2 | | | n |
| | A2 | 1 | 2 | | | n |
| | | | | | | |
| | Xn | 1 | 2 | | | n |
| Mn | E | | | | | n |
| | Dn | 1 | 2 | | | n |
| | An | 1 | 2 | | | n |

LOCATION          MACHINE

| | | | | | | |
|---|---|---|---|---|---|---|
| A | 1 | 2 | | | | |
| B | 1 | | | | | |
| ⋮ | | | | | | |
| D | 1 | 2 | | | | n |
| E | | | | | | n |
| ⋮ | | | | | | |
| ⋮ | | | | | | |
| ⋮ | | | | | | |
| X | 1 | 2 | | | | n |

FIG. 25

MACHINE          TABLE

M1

| X1 | 1 | 2 | | | n |
|---|---|---|---|---|---|
| B | 1 | | | | |
| A1 | 1 | 2 | | | |
| D1 | 1 | 2 | | | n |

M2

| X2 | 1 | 2 | | | n |
|---|---|---|---|---|---|
| D2 | 1 | 2 | | | n |
| A2 | 1 | 2 | | | |

Mn

| Xn | 1 | 2 | | | n |
|---|---|---|---|---|---|
| E | | | | | n |
| Dn | 1 | 2 | | | n |

FIG. 26

MODIFIED MACHINE ARCHITECTURE WITH PARTIAL MEMORY UPDATING

CROSS-REFERENCE TO RELATED APPLICATIONS

This is a divisional application under 35 USC 121 of U.S. Application Ser. No. 11/583,958, filed Oct. 18, 2006, entitled "Modified Machine Architecture With Partial Memory Updating," now U.S. Pat. No. 7,660,960, issued Feb. 9, 2010; and which claims benefit to U.S. Provisional Application No. 60/730,543, entitled "Modified Machine Architecture with Partial Memory Updating," filed Oct. 25, 2005; hereby incorporated by reference.

FIELD OF THE INVENTION

The present invention relates to computing and, in particular, to the simultaneous operation of a plurality of computers interconnected via a communications network.

BACKGROUND ART

International Patent Application No. PCT/AU2005/000580 published under WO 2005/103926 (to which U.S. patent application Ser. No. 11/111,946 and published under No. 2005-0262313 corresponds) in the name of the present applicant, discloses how different portions of an application program written to execute on only a single computer can be operated substantially simultaneously on a corresponding different one of a plurality of computers. That simultaneous operation has not been commercially used as of the priority date of the present application. International Patent Application Nos. PCT/AU2005/001641 to which U.S. patent application Ser. No. 11/259,885 entitled: "Computer Architecture Method of Operation for Multi-Computer Distributed Processing and Co-ordinated Memory and Asset Handling" corresponds and PCT/AU2006/000532 in the name of the present applicant and unpublished as at the priority date of the present application, also disclose further details. The contents of each of the abovementioned prior application(s) are hereby incorporated into the present application by cross reference for all purposes.

Briefly stated, the abovementioned patent specifications disclose that at least one application program written to be operated on only a single computer can be simultaneously operated on a number of computers each with independent local memory. The memory locations required for the operation of that program are replicated in the independent local memory of each computer. On each occasion on which the application program writes new data to any replicated memory location, that new data is transmitted and stored at each corresponding memory location of each computer. Thus apart from the possibility of transmission delays, each computer has a local memory the contents of which are substantially identical to the local memory of each other computer and are updated to remain so. Since all application programs, in general, read data much more frequently than they cause new data to be written, the abovementioned arrangement enables very substantial advantages in computing speed to be achieved. In particular, the stratagem enables two or more commodity computers interconnected by a commodity communications network to be operated simultaneously running under the application program written to be executed on only a single computer.

In many situations, the above-mentioned arrangements work satisfactorily. This applies particularly where the programmer is aware that there may be updating delays and so can adjust the flow of the program to account for this. However, there are situations in which the use of stale contents or values instead of the latest content can create problems.

The genesis of the present invention is a desire to increase of the speed of operation of the multiple computer system by reducing the volume of data which requires to be updated.

SUMMARY OF THE INVENTION

In accordance with a first aspect of the present invention there is disclosed a method of selecting independent memory locations to be substantially simultaneously updated in a multiple computer environment in which different portions of at least one application program written to execute on only a single computer are executed substantially simultaneously each on a corresponding different one of said multiple computers, said method comprising the steps of:

(i) selecting a first group of memory locations each of which is replicated on each said computer, (ii) ignoring a second group of memory locations each of which is present only in the specific one of said computers in which each said second group memory location is physically located, (iii) promoting from said second group any memory location to which a memory location in said first group begins to refer, (iv) replicating the said promoted second group location in all other ones of said computers other than the one in which it was physically located when in said second group, (v) assigning said replicated promoted second group locations to said first group, and (vi) substantially simultaneously updating said first group locations of the other ones of said computers with any changes made to a first group location of any one of said computers.

In accordance with a second aspect of the present invention there is disclosed a multiple computer system in which different portions of at least one application program written to execute on only a single computer execute substantially simultaneously each on a corresponding one of a plurality of computers, each of which has an independent local memory and all of which are interconnected by a communications network, wherein memory locations present in said local memories are categorized into two groups, a first group of memory locations each of which is replicated on each said computer, and a second group of memory locations each of which is present only in the specific one of said computers in which each said second group memory location is physically present, said system comprising memory updating means to update via said communications network any changes made to a memory location of said first group in one computer to all other corresponding memory locations of said other computers, and promotion means to promote from said second group to said first group any memory location of said second group which, as a result of execution of said application program, is now referred top by a memory location of said first group.

In accordance with a third aspect of the present invention there is disclosed a single computer adapted to co-operate with at least one other computer in order to carry out the above method or form the above computer system.

In accordance with a fourth aspect of the present invention there is disclosed a computer program product comprising a set of program instructions stored in a storage medium and operable to permit a plurality of computers to carry out the above defined method.

In accordance with a fifth aspect of the present invention there is disclosed a plurality of computers interconnected via a communications network and operable to ensure carrying out of the above described method.

BRIEF DESCRIPTION OF THE DRAWINGS

Preferred embodiments of the present invention will now be described with reference to the drawings in which:

FIG. 1A is a schematic illustration of a prior art computer arranged to operate JAVA code and thereby constitute a single JAVA virtual machine, FIG. 1B is a drawing similar to FIG. 1A but illustrating the initial loading of code, FIG. 1C illustrates the interconnection of a multiplicity of computers each being a JAVA virtual machine to form a multiple computer system, FIG. 2 schematically illustrates "n" application running computers to which at least one additional server machine X is connected as a server.

DETAILED DESCRIPTION

Figure 2:
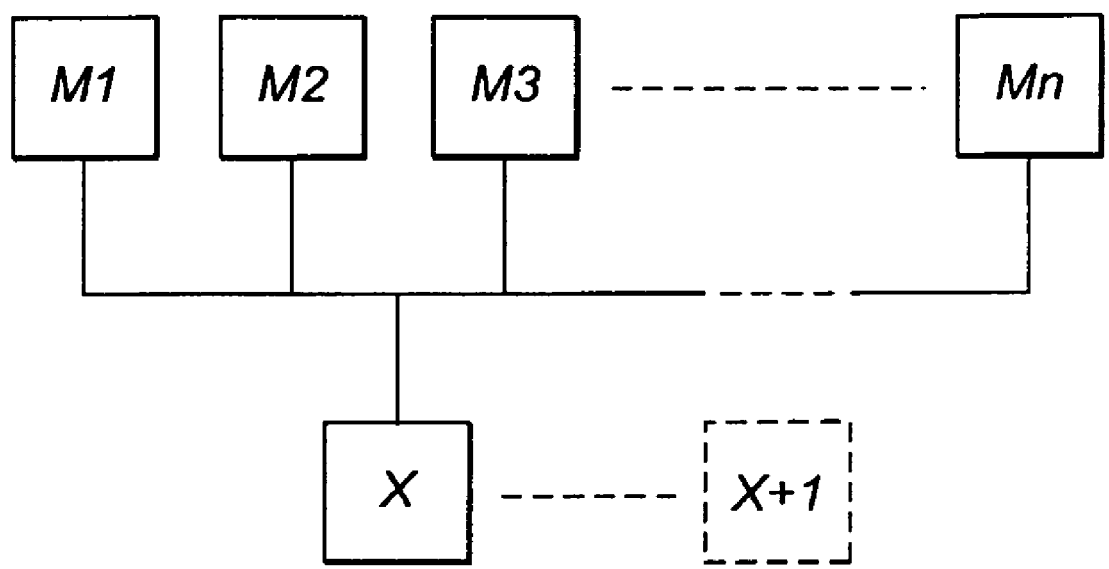

The embodiments will be described with reference to the JAVA language, however, it will be apparent to those skilled in the art that the invention is not limited to this language and, in particular can be used with other languages (including procedural, declarative and object oriented languages) including the MICROSOFT.NET platform and architecture (Visual Basic, Visual C, and Visual C++, and Visual C#), FORTRAN, C, C++, COBOL, BASIC and the like.

It is known in the prior art to provide a single computer or machine (produced by any one of various manufacturers and having an operating system (or equivalent control software or other mechanism) operating in any one of various different languages) utilizing the particular language of the application by creating a virtual machine as illustrated in FIG. 1A.

The code and data and virtual machine configuration or arrangement of FIG. 1A takes the form of the application code 50 written in the JAVA language and executing within the JAVA virtual machine 61. Thus where the intended language of the application is the language JAVA, a JAVA virtual machine is used which is able to operate code in JAVA irrespective of the machine manufacturer and internal details of the computer or machine. For further details, see "The JAVA Virtual Machine Specification" $2^{nd}$ Edition by T. Lindholm and F. Yellin of Sun Microsystems Inc of the USA which is incorporated herein by reference.

This conventional art arrangement of FIG. 1A is modified in accordance with embodiments of the present invention by the provision of an additional facility which is conveniently termed a "distributed run time" or a "distributed run time system" DRT 71 and as seen in FIG. 1B.

In FIGS. 1B and 1C, the application code 50 is loaded onto the Java Virtual Machine(s) M1, M2, ... Mn in cooperation with the distributed runtime system 71, through the loading procedure indicated by arrow 75 or 75A or 75B. As used herein the terms "distributed runtime" and the "distributed run time system" are essentially synonymous, and by means of illustration but not limitation are generally understood to include library code and processes which support software written in a particular language running on a particular platform. Additionally, a distributed runtime system may also include library code and processes which support software written in a particular language running within a particular distributed computing environment. A runtime system (whether a distributed runtime system or not) typically deals with the details of the interface between the program and the operating system such as system calls, program start-up and termination, and memory management. For purposes of background, a conventional Distributed Computing Environment (DCE) (that does not provide the capabilities of the inventive distributed run time or distributed run time system 71 used in the preferred embodiments of the present invention) is available from the Open Software Foundation. This Distributed Computing Environment (DCE) performs a form of computer-to-computer communication for software running on the machines, but among its many limitations, it is not able to implement the desired modification or communication operations. Among its functions and operations the preferred DRT 71 coordinates the particular communications between the plurality of machines M1, M2 ... Mn. Moreover, the preferred distributed runtime 71 comes into operation during the loading procedure indicated by arrow 75A or 75B of the JAVA application 50 on each JAVA virtual machine 72 or machines JVM#1, JVM#2, ... JVM#n of FIG. 1C. It will be appreciated in light of the description provided herein that although many examples and descriptions are provided relative to the JAVA language and JAVA virtual machines so that the reader may get the benefit of specific examples, the invention is not restricted to either the JAVA language or JAVA virtual machines, or to any other language, virtual machine, machine or operating environment.

FIG. 1C shows in modified form the arrangement of the JAVA virtual machines, each as illustrated in FIG. 1B. It will be apparent that again the same application code 50 is loaded onto each machine M1, M2 ... Mn. However, the communications between each machine M1, M2 ... Mn are as indicated by arrows 83, and although physically routed through the machine hardware, are advantageously controlled by the individual DRT's 71/1 ... 71/n within each machine. Thus, in practice this may be conceptionalised as the DRT's 71/1, ... 71/n communicating with each other via the network or other communications link 53 rather than the machines M1, M2 ... Mn communicating directly themselves or with each other. Contemplated and included are either this direct communication between machines M1, M2 ... Mn or DRT's 71/1, 71/2 ... 71/n or a combination of such communications. The preferred DRT 71 provides communication that is transport, protocol, and link independent.

The one common application program or application code 50 and its executable version (with likely modification) is simultaneously or concurrently executing across the plurality of computers or machines M1, M2 ... Mn. The application program 50 is written to execute on a single machine or computer (or to operate on the multiple computer system of the abovementioned patent applications which emulate single computer operation). Essentially the modified structure is to replicate an identical memory structure and contents on each of the individual machines.

The term "common application program" is to be understood to mean an application program or application program code written to operate on a single machine, and loaded and/or executed in whole or in part on each one of the plurality of computers or machines M1, M2 ... Mn, or optionally on each one of some subset of the plurality of computers or machines M1, M2 ... Mn. Put somewhat differently, there is a common application program represented in application code 50. This is either a single copy or a plurality of identical copies each individually modified to generate a modified copy or version of the application program or program code. Each copy or instance is then prepared for execution on the corresponding machine. At the point after they are modified they are common in the sense that they perform similar operations and operate consistently and coherently with each other. It will be appreciated that a plurality of computers, machines, information appliances, or the like implementing embodiments of the invention may optionally be connected to or coupled with other computers, machines, information appliances, or the like that do not implement embodiments of the invention.

The same application program 50 (such as for example a parallel merge sort, or a computational fluid dynamics application or a data mining application) is run on each machine, but the executable code of that application program is modified on each machine as necessary such that each executing instance (copy or replica) on each machine coordinates its local operations on that particular machine with the operations of the respective instances (or copies or replicas) on the other machines such that they function together in a consistent, coherent and coordinated manner and give the appearance of being one global instance of the application (i.e. a "meta-application").

The copies or replicas of the same or substantially the same application codes, are each loaded onto a corresponding one of the interoperating and connected machines or computers. As the characteristics of each machine or computer may differ, the application code 50 may be modified before loading, or during the loading process, or with some disadvantages after the loading process, to provide a customization or modification of the application code on each machine. Some dissimilarity between the programs or application codes on the different machines may be permitted so long as the other requirements for interoperability, consistency, and coherency as described herein can be maintained. As it will become apparent hereafter, each of the machines M1, M2 ... Mn and thus all of the machines M1, M2 ... Mn have the same or substantially the same application code 50, usually with a modification that may be machine specific.

Before the loading of, or during the loading of, or at any time preceding the execution of, the application code 50 (or the relevant portion thereof) on each machine M1, M2 ... Mn, each application code 50 is modified by a corresponding modifier 51 according to the same rules (or substantially the same rules since minor optimizing changes are permitted within each modifier 51/1, 51/2 ... 51/n).

Each of the machines M1, M2 ... Mn operates with the same (or substantially the same or similar) modifier 51 (in some embodiments implemented as a distributed run time or DRT71 and in other embodiments implemented as an adjunct to the application code and data 50, and also able to be implemented within the JAVA virtual machine itself). Thus all of the machines M1, M2 ... Mn have the same (or substantially the same or similar) modifier 51 for each modification required. A different modification, for example, may be required for memory management and replication, for initialization, for finalization, and/or for synchronization (though not all of these modification types may be required for all embodiments).

There are alternative implementations of the modifier 51 and the distributed run time 71. For example, as indicated by broken lines in FIG. 1C, the modifier 51 may be implemented as a component of or within the distributed run time 71, and therefore the DRT 71 may implement the functions and operations of the modifier 51. Alternatively, the function and operation of the modifier 51 may be implemented outside of the structure, software, firmware, or other means used to implement the DRT 71 such as within the code and data 50, or within the JAVA virtual machine itself. In one embodiment, both the modifier 51 and DRT 71 are implemented or written in a single piece of computer program code that provides the functions of the DRT and modifier. In this case the modifier function and structure is, in practice, subsumed into the DRT. Independent of how it is implemented, the modifier function and structure is responsible for modifying the executable code of the application code program, and the distributed run time function and structure is responsible for implementing communications between and among the computers or machines. The communications functionality in one embodiment is implemented via an intermediary protocol layer within the computer program code of the DRT on each machine. The DRT can, for example, implement a communications stack in the JAVA language and use the Transmission Control Protocol/Internet Protocol (TCP/IP) to provide for communications or talking between the machines. These functions or operations may be implemented in a variety of ways, and it will be appreciated in light of the description provided herein that exactly how these functions or operations are implemented or divided between structural and/or procedural elements, or between computer program code or data structures, is not important or crucial to the invention.

However, in the arrangement illustrated in FIG. 1C, a plurality of individual computers or machines M1, M2 ... Mn are provided, each of which are interconnected via a communications network 53 or other communications link. Each individual computer or machine is provided with a corresponding modifier 51. Each individual computer is also provided with a communications port which connects to the communications network. The communications network 53 or path can be any electronic signalling, data, or digital communications network or path and is preferably a slow speed, and thus low cost, communications path, such as a network connection over the Internet or any common networking configurations including ETHERNET or INFINIBAND and extensions and improvements, thereto. Preferably, the computers are provided with one or more known communications ports (such as CISCO Power Connect 5224 Switches) which connect with the communications network 53.

As a consequence of the above described arrangement, if each of the machines M1, M2, . . . , Mn has, say, an internal or local memory capability of 10 MB, then the total memory available to the application code 50 in its entirety is not, as one might expect, the number of machines (n) times 10 MB. Nor is it the additive combination of the internal memory capability of all n machines. Instead it is either 10 MB, or some number greater than 10 MB but less than n×10 MB. In the situation where the internal memory capacities of the machines are different, which is permissible, then in the case where the internal memory in one machine is smaller than the internal memory capability of at least one other of the machines, then the size of the smallest memory of any of the machines may be used as the maximum memory capacity of the machines when such memory (or a portion thereof) is to be treated as 'common' memory (i.e. similar equivalent memory on each of the machines M1 . . . Mn) or otherwise used to execute the common application code.

However, even though the manner that the internal memory of each machine is treated may initially appear to be a possible constraint on performance, how this results in improved operation and performance will become apparent hereafter. Naturally, each machine M1, M2 . . . Mn has a private (i.e. 'non-common') internal memory capability. The private internal memory capability of the machines M1, M2, . . . , Mn are normally approximately equal but need not be. For example, when a multiple computer system is implemented or organized using existing computers, machines, or information appliances, owned or operated by different entities, the internal memory capabilities may be quite different. On the other hand, if a new multiple computer system is being implemented, each machine or computer is preferably selected to have an identical internal memory capability, but this need not be so.

It is to be understood that the independent local memory of each machine represents only that part of the machine's total memory which is allocated to that portion of the application program running on that machine. Thus, other memory will be occupied by the machine's operating system and other computational tasks unrelated to the application program 50.

Non-commercial operation of a prototype multiple computer system indicates that not every machine or computer in the system utilises or needs to refer to (e.g. have a local replica of) every possible memory location. As a consequence, it is possible to operate a multiple computer system without the local memory of each machine being identical to every other machine, so long as the local memory of each machine is sufficient for the operation of that machine. That is to say, provided a particular machine does not need to refer to (for example have a local replica of) some specific memory locations, then it does not matter that those specific memory locations are not replicated in that particular machine.

It may also be advantageous to select the amounts of internal memory in each machine to achieve a desired performance level in each machine and across a constellation or network of connected or coupled plurality of machines, computers, or information appliances M1, M2, . . . , Mn. Having described these internal and common memory considerations, it will be apparent in light of the description provided herein that the amount of memory that can be common between machines is not a limitation.

In some embodiments, some or all of the plurality of individual computers or machines can be contained within a single housing or chassis (such as so-called "blade servers" manufactured by Hewlett-Packard Development Company, Intel Corporation, IBM Corporation and others) or the multiple processors (eg symmetric multiple processors or SMPs) or multiple core processors (eg dual core processors and chip multithreading processors) manufactured by Intel, AMD, or others, or implemented on a single printed circuit board or even within a single chip or chip set. Similarly, also included are computers or machines having multiple cores, multiple CPU's or other processing logic.

When implemented in a non-JAVA language or application code environment, the generalized platform, and/or virtual machine and/or machine and/or runtime system is able to operate application code 50 in the language(s) (possibly including for example, but not limited to any one or more of source-code languages, intermediate-code languages, object-code languages, machine-code languages, and any other code languages) of that platform and/or virtual machine and/or machine and/or runtime system environment, and utilize the platform, and/or virtual machine and/or machine and/or runtime system and/or language architecture irrespective of the machine or processor manufacturer and the internal details of the machine. It will also be appreciated that the platform and/or runtime system can include virtual machine and non-virtual machine software and/or firmware architectures, as well as hardware and direct hardware coded applications and implementations.

For a more general set of virtual machine or abstract machine environments, and for current and future computers and/or computing machines and/or information appliances or processing systems, and that may not utilize or require utilization of either classes and/or objects, the inventive structure, method and computer program and computer program product are still applicable. Examples of computers and/or computing machines that do not utilize either classes and/or objects include for example, the x86 computer architecture manufactured by Intel Corporation and others, the SPARC computer architecture manufactured by Sun Microsystems, Inc and others, the Power PC computer architecture manufactured by International Business Machines Corporation and others, and the personal computer products made by Apple Computer, Inc., and others.

For these types of computers, computing machines, information appliances, and the virtual machine or virtual computing environments implemented thereon that do not utilize the idea of classes or objects, may be generalized for example to include primitive data types (such as integer data types, floating point data types, long data types, double data types, string data types, character data types and Boolean data types), structured data types (such as arrays and records), derived types, or other code or data structures of procedural languages or other languages and environments such as functions, pointers, components, modules, structures, reference and unions. These structures and procedures when applied in combination when required, maintain a computing environment where memory locations, address ranges, objects, classes, assets, resources, or any other procedural or structural aspect of a computer or computing environment are where required created, maintained, operated, and deactivated or deleted in a coordinated, coherent, and consistent manner across the plurality of individual machines M1, M2 . . . Mn.

This analysis or scrutiny of the application code 50 can take place either prior to loading the application program code 50, or during the application program code 50 loading procedure, or even after the application program code 50 loading procedure (or some combination of these). It may be likened to an instrumentation, program transformation, translation, or compilation procedure in that the application code can be instrumented with additional instructions, and/or otherwise modified by meaning-preserving program manipulations, and/or optionally translated from an input code language to a different code language (such as for example from source-code language or intermediate-code language to object-code language or machine-code language). In this connection it is understood that the term compilation normally or conventionally involves a change in code or language, for example, from source code to object code or from one language to another language. However, in the present instance the term "compilation" (and its grammatical equivalents) is not so restricted and can also include or embrace modifications within the same code or language. For example, the compilation and its equivalents are understood to encompass both ordinary compilation (such as for example by way of illustration but not limitation, from source-code to object code), and compilation from source-code to source-code, as well as compilation from object-code to object code, and any altered combinations therein. It is also inclusive of so-called "intermediary-code languages" which are a form of "pseudo object-code".

By way of illustration and not limitation, in one embodiment, the analysis or scrutiny of the application code 50 takes place during the loading of the application program code such as by the operating system reading the application code 50 from the hard disk or other storage device, medium or source and copying it into memory and preparing to begin execution of the application program code. In another embodiment, in a JAVA virtual machine, the analysis or scrutiny may take place during the class loading procedure of the java.lang.Class-Loader.loadClass method (e.g. "java.lang.ClassLoader.loadClass( )").

Alternatively, or additionally, the analysis or scrutiny of the application code 50 (or of a portion of the application code) may take place even after the application program code loading procedure, such as after the operating system has loaded the application code into memory, or optionally even after execution of the relevant corresponding portion of the application program code has started, such as for example after the JAVA virtual machine has loaded the application code into the virtual machine via the "java.lang.ClassLoader.loadClass( )" method and optionally commenced execution.

Persons skilled in the computing arts will be aware of various possible techniques that may be used in the modification of computer code, including but not limited to instrumentation, program transformation, translation, or compilation means and/or methods.

One such technique is to make the modification(s) to the application code, without a preceding or consequential change of the language of the application code. Another such technique is to convert the original code (for example, JAVA language source-code) into an intermediate representation (or intermediate-code language, or pseudo code), such as JAVA byte code. Once this conversion takes place the modification is made to the byte code and then the conversion may be reversed. This gives the desired result of modified JAVA code.

A further possible technique is to convert the application program to machine code, either directly from source-code or via the abovementioned intermediate language or through some other intermediate means. Then the machine code is modified before being loaded and executed. A still further such technique is to convert the original code to an intermediate representation, which is thus modified and subsequently converted into machine code.

The present invention encompasses all such modification routes and also a combination of two, three or even more, of such routes.

The DRT 71 or other code modifying means is responsible for creating or replicating a memory structure and contents on each of the individual machines M1, M2 . . . Mn that permits the plurality of machines to interoperate. In some embodiments this replicated memory structure will be identical. Whilst in other embodiments this memory structure will have portions that are identical and other portions that are not. In still other embodiments the memory structures are different only in format or storage conventions such as Big Endian or Little Endian formats or conventions.

These structures and procedures when applied in combination when required, maintain a computing environment where the memory locations, address ranges, objects, classes, assets, resources, or any other procedural or structural aspect of a computer or computing environment are where required created, maintained, operated, and deactivated or deleted in a coordinated, coherent, and consistent manner across the plurality of individual machines M, M2 . . . Mn.

Therefore the terminology "one", "single", and "common" application code or program includes the situation where all machines M1, M2 . . . Mn are operating or executing the same program or code and not different (and unrelated) programs, in other words copies or replicas of same or substantially the same application code are loaded onto each of the interoperating and connected machines or computers.

In conventional arrangements utilising distributed software, memory access from one machine's software to memory physically located on another machine typically takes place via the network interconnecting the machines. Thus, the local memory of each machine is able to be accessed by any other machine and can therefore cannot be said to be independent. However, because the read and/or write memory access to memory physically located on another computer require the use of the slow network interconnecting the computers, in these configurations such memory accesses can result in substantial delays in memory read/write processing operations, potentially of the order of $10^6$-$10^7$ cycles of the central processing unit of the machine (given contemporary processor speeds). Ultimately this delay is dependent upon numerous factors, such as for example, the speed, bandwidth, and/or latency of the communication network. This in large part accounts for the diminished performance of the multiple interconnected machines in the prior art arrangement.

However, in the present arrangement all reading of memory locations or data is satisfied locally because a current value of all (or some subset of all) memory locations is stored on the machine carrying out the processing which generates the demand to read memory.

Similarly, all writing of memory locations or data is satisfied locally because a current value of all (or some subset of all) memory locations is stored on the machine carrying out the processing which generates the demand to write to memory.

Such local memory read and write processing operation can typically be satisfied within $10^2$-$10^3$ cycles of the central processing unit. Thus, in practice there is substantially less waiting for memory accesses which involves and/or writes. Also, the local memory of each machine is not able to be accessed by any other machine and can therefore be said to be independent.

The invention is transport, network, and communications path independent, and does not depend on how the communication between machines or DRTs takes place. In one embodiment, even electronic mail (email) exchanges between machines or DRTs may suffice for the communications.

In connection with the above, it will be seen from FIG. 2 that there are a number of machines M1, M2, . . . Mn, "n" being an integer greater than or equal to two, on which the application program 50 of FIG. 1 is being run substantially simultaneously. These machines are allocated a number 1, 2, 3, . . . etc. in a hierarchical order. This order is normally looped or closed so that whilst machines 2 and 3 are hierarchically adjacent, so too are machines "n" and 1. There is preferably a further machine X which is provided to enable various housekeeping functions to be carried out, such as acting as a lock server. In particular, the further machine X can be a low value machine, and much less expensive than the other machines which can have desirable attributes such as processor speed. Furthermore, an additional low value machine (X+1) is preferably available to provide redundancy in case machine X should fail. Where two such server machines X and X+1 are provided, they are preferably, for reasons of simplicity, operated as dual machines in a cluster configuration. Machines X and X+1 could be operated as a multiple computer system in accordance with the present invention, if desired. However, this would result in generally undesirable complexity. If the machine X is not provided then its functions, such as housekeeping functions, are provided by one, or some, or all of the other machines.

The abovementioned incorporated by reference specifications disclose a system in which corresponding memory locations can be updated to ensure that the contents of each local memory are substantially identical, apart from a transmission delay. However, as the number of machines increases and the complexity of the applications program also increase, so the volume of data required to be transmitted over the communications network 53 also increases.

In order to overcome this problem, in accordance with one embodiment of the present invention, the memory locations which potentially require updating are divided into at least two categories. The first category consists of those memory locations which are accessible by any two or more of the multiple machines and thus should be continuously updated. The second category consists of those memory locations which are accessible only by the local machine where the memory location is physically located. For these memory locations it is undesirable to, firstly, replicate the contents of that memory location on all the other machines, and secondly, to continue to update the contents of the replicated memory locations each time that the original local memory contents change. Memory locations which fall into the two categories are easily able to be distinguished by whether or not there is a pointer pointing to the memory location concerned. There are several mechanisms, or modes, whereby this categorisation and data transfer can take place.

Figures 3, 4:
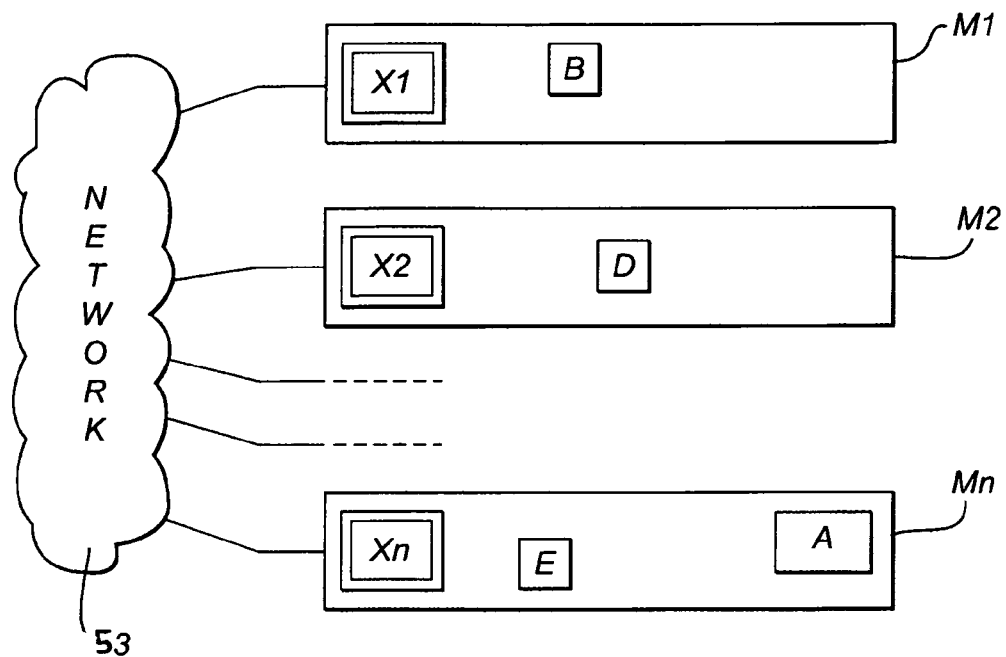
FIG. 3 is a schematic map of the memory locations in all the multiple machines showing memory locations including classes and objects.
FIG. 4 is a table showing the various memory locations of FIG. 3 and their ability to be reached.

Turning now to FIG. 3, each of the multiple machines M1, M2 . . . Mn (other than any server machine X if present) has its memory locations schematically illustrated. For machine M1 there is a class X1 and an object B. For machine M2 there is a class X2 which is the same as for machine M1, and an object D. For machine Mn there is the same class Xn and two objects A and E. The contents of the memory location X are the same for each of the machines and each machine is able to both read from, and write to, memory location X. For this reason, the boundary of memory location X is indicated with a double line.

Preferably, it is convenient for the server machine X of FIG. 2, to maintain a table listing each memory location and the machines which are able to access each memory location in the table. Such a table is said to be a reachability table and is illustrated in FIG. 4. The first row in the table of FIG. 4 deals with memory location A which is only able to be accessed by machine Mn. The second row in the table of FIG. 4 deals with memory location B which is only able to be accessed by machine M1. Similarly, object D is only able to be accessed by machine M2 and object E is only able to be accessed by machine Mn. However, the class X is able to be accessed by all of the machines M1, M2 and Mn.

In the multi-machine environment described above, in the event that the content of class X is changed by being written to by one of the machines, then it is necessary to transmit that change in content via the network 53 to all the other machines. However, since the objects A, B, D and E are each are only able to be accessed by a single machine, there is little point in either creating or updating the contents of these memory locations since they are only able to be accessed by their local machine.

Figures 5, 6:
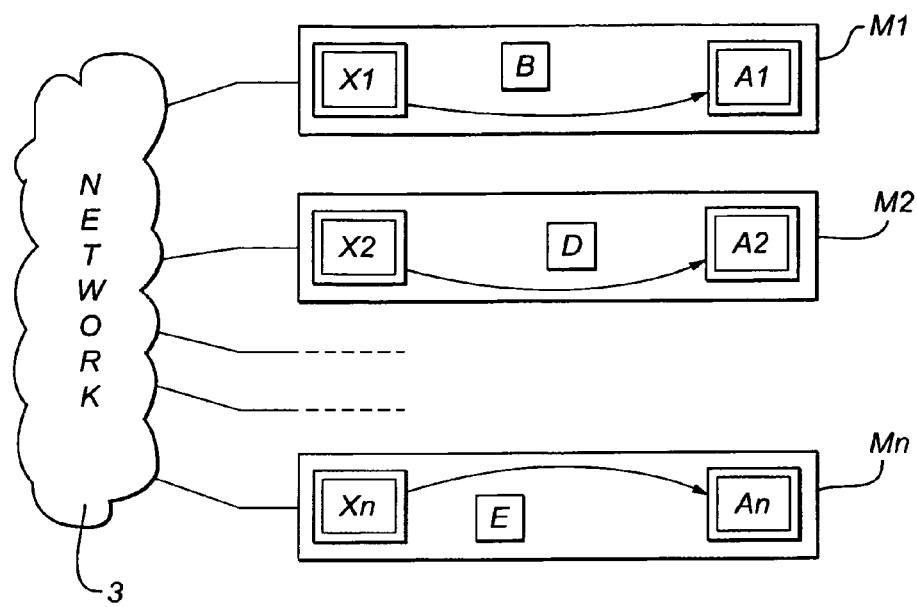
FIG. 5 is a map similar to FIG. 3 and showing the consequence of memory location X pointing to memory location A.
FIG. 6 is the reachability table corresponding to FIG. 5.

If now during the processing carried out by a particular machine, say machine Mn, the class Xn needs to refer to the object A, then class Xn is said to point to object A. This is indicated in FIG. 5 by an arrow pointing from class Xn to object A. The change in status of object A means that it is now able to be accessed or referenced by all the other machines. For this reason in FIG. 5 it is named object An, is bounded by double lines, and is reproduced in each of the other machines as object A1, A2, etc. Furthermore, an arrow points from each corresponding class X1, X2, etc to the corresponding referred object A1, A2, etc. As a result of this change of status of object A, the first row of the reachability table of FIG. 4 is amended as illustrated in FIG. 6 so as to indicate that object A is now able to be reached by the machines M1, M2 and Mn. The server machine X of FIG. 2 uses the amended reachability table of FIG. 6 to ensure that the contents of object A, if amended by one machine, are transmitted via the network 3 to all the other machines.

Figures 7, 8:
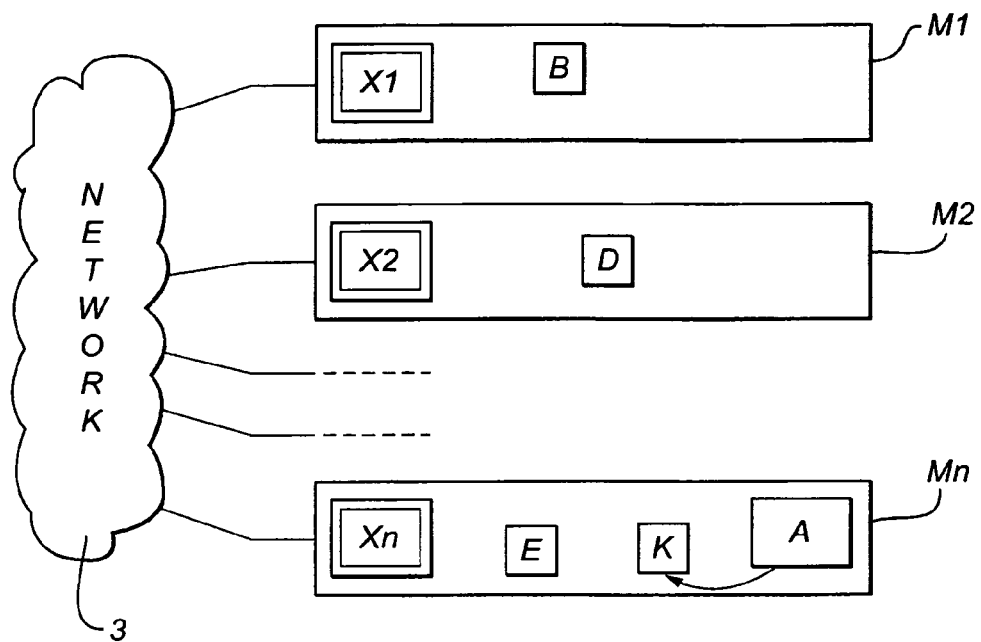
FIG. 7 is a map similar to FIG. 3 and showing memory location A pointing to new memory location K.
FIG. 8 is the reachability table corresponding to FIG. 7.

FIGS. 7 and 8 illustrate a further modification. Here object A in machine Mn, as a result of the processing carried out by machine Mn, now points to a new object K. As a consequence, it is now necessary for an additional row to be inserted into the reachability table as illustrated in FIG. 8. This new row illustrates that object K is only able to be accessed by machine Mn.

Figures 9, 10:
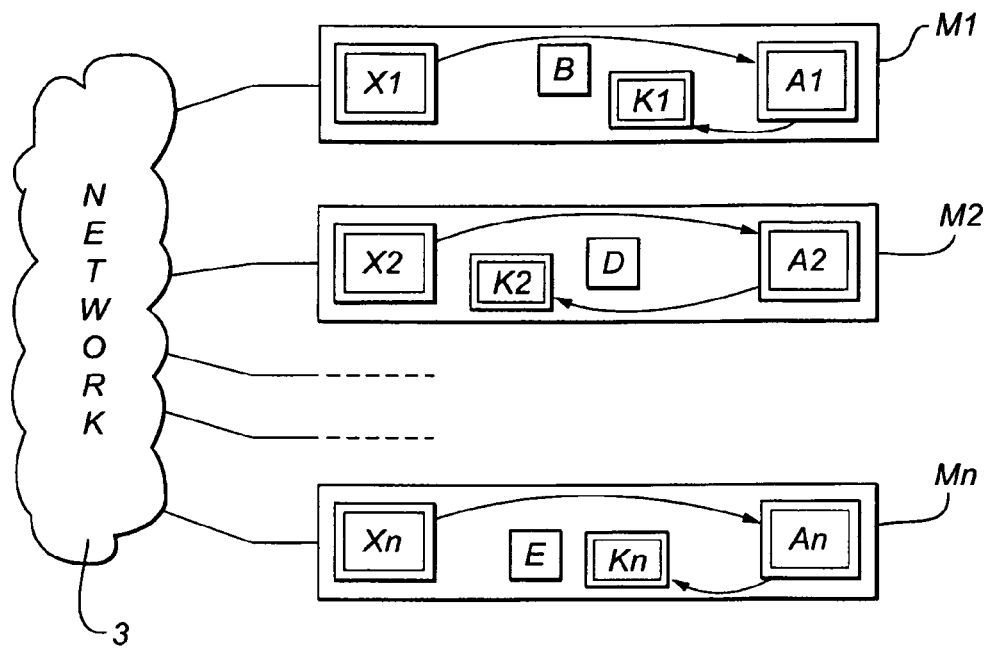
FIG. 9 is a map similar to FIG. 7 but showing the consequence of memory location X pointing to memory location A.
FIG. 10 is the reachability table corresponding to FIG. 9, FIGS. 11-14 illustrate multiple reachability tables respectively corresponding to the individual reachability tables of FIGS. 4, 6, 8 and 10.

Under these circumstances, if the modification previously described above in relation to FIG. 5, takes place, then the situation illustrated in FIG. 9 arises. Since class Xn now points to object An, as before object A is replicated in each of the other machines. However, since object An itself points to object K, it is necessary for each of the objects K to be replicated in each of the other machines. This gives rise to objects K1, K2, . . . Kn. Furthermore, each of these objects is accessible by all machines and consequently these objects are indicated by double lines in FIG. 9. The corresponding changes to the reachability table are indicated in FIG. 10 where an object K is now indicated as being accessible by all machines.

The abovementioned detailed description refers to memory locations, however, it is equally applicable to structures, assets or resources (which in JAVA are termed classes or objects). These will have already been allocated a (global) name or tag which can be used globally by all machines (since it is understood that the local memory structure of different machines may be different). Thus, the local or actual name allocated to a specific memory location in one machine may well be different from the local name allocated to the corresponding memory location in another machine. This global name allocation preferably happens during a compilation process at loading when the classes or objects are originally initialized. This is most conveniently done via a table maintained by the server machine X. This table can also include the reachability data.

It will be apparent to those skilled in the computing arts that the reachability data enables structures, assets or resources (ie memory locations) to be divided into two categories or classes. The first category consists of those locations which are able to be accessed by all machines. It is necessary that write actions carried out in respect of such memory locations be distributed to all machines so that all corresponding memory locations have the same content (except for delays due to transmission of updating data). However, in respect of the second category, since these memory locations are only accessible by the local machine, write actions to these memory locations need not be distributed to all the other machines, nor need there be corresponding memory locations on the other machines. As a consequence of this categorisation, a substantial volume of data is not required to be transmitted from one machine to the others and so the volume of traffic on the network 53 is substantially reduced.

In the foregoing description, a single reachability table is provided which is located in, and maintained by, the server machine X. However, it is also possible for the computer system to be operated without a server machine X in which case it is desirable for each machine to operate its own reachability table. FIGS. 11-14 illustrate individual reachability tables for the individual machines in the circumstances corresponding to FIGS. 4, 6, 8 and 10 respectively.

Thus, in FIG. 11 the table for machine M1 has a row for class X and a row for object B. Similarly, the table for machine M2 has a row for class X and a row for object D. However, the table for machine Mn has three rows, one for class X, and one for each of objects A and E. When the change illustrated by comparison of FIGS. 3 and 5 takes place, since class Xn now refers to object An, and thus all the other classes X1, X2, etc must now refer to corresponding objects A1, A2, etc. so all machines must now include a row in their reachability table for object A. This is the situation illustrated in FIG. 12. The other machines are said to inherit the table entry for object A.

Machine Mn can determine that object A requires replication across the other machines by consulting the table entry for class X on machine Mn. In the situation illustrated, machine Mn makes a positive determination for replication by comparing the table entries for object A and class X. If the table entry for object A includes all machines in the table entry for class X, then machine Mn can correctly determine that object A does not need to be further replicated on any other machines. Additionally, no table entries need to be added to, or updated on, other machines. Alternatively, if the table entry of object A does not include the full set of machines in the table entry of class X then machine Mn updates the table entry for object A to include the set of machines listed in the table entry for class X, and additionally instructs all machines listed in the new table entry for object A to update their local tables for object A with the set of machines listed in the new table entry for object A on machine Mn. Finally, for the set of machines which were not already present in the table entry for object A on machine Mn prior to the inheritance of the set of machines of class X on machine Mn, machine Mn instructs those machines (ie machines M1 and M2) to add a local table entry for object A and create local replicas in memory of object A and associated references to class X.

Similarly, with reference to FIG. 7 when the additional object K is created by machine Mn, so an additional row for object K is created in the reachability table for machine Mn as illustrated in FIG. 13 as machines M1 and M2 do not have a local replica of object K and, as shown in FIG. 7, neither do they have a table entry for objects A and K. As illustrated in FIG. 9, the assignment of a reference of object A to class X requires that object A inherits the table entries of class X. However, in addition, as object A in turn references object K, object K must also indirectly inherit the table entry of class X by inheriting the newly updated table entry of object A (including now the inherited values of the table entry for class X). In accordance with the updating of table entries for objects A and K on machine Mn, machine Mn instructs all machines listed in the table entry for objects A and K to update their local tables, and further instructs all machines not originally present in the table entries of objects A and K respectively to create local replicas of objects A and K. The resulting tables for the individual machines are illustrated in FIG. 14.

Figures 15, 16:
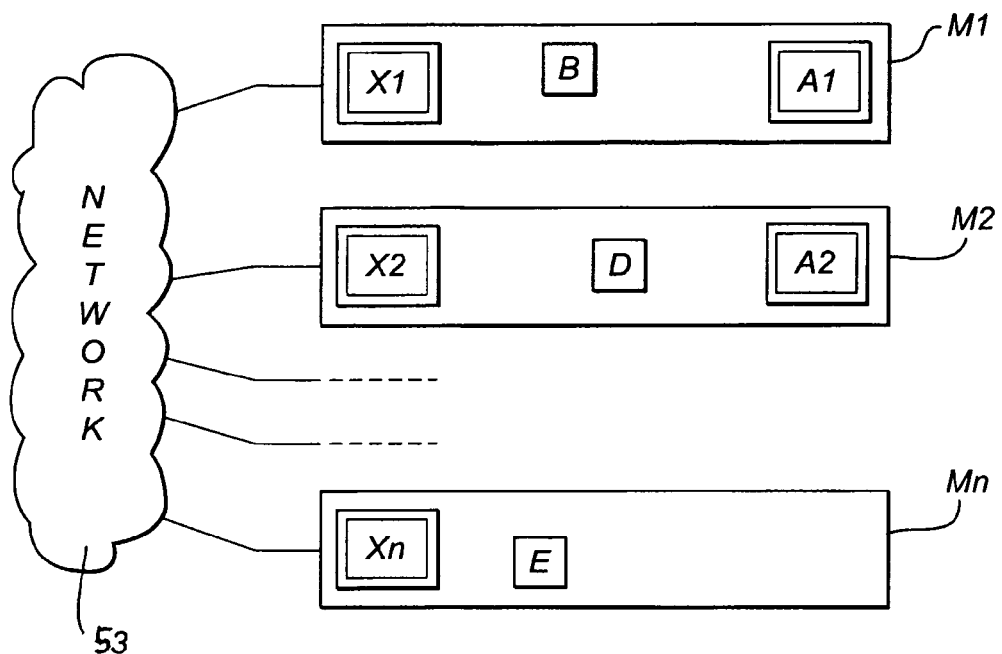
FIG. 15 illustrates a further memory change, FIGS. 16 and 17 respectively illustrate the single and multiple reachability tables corresponding to the memory changes of FIG. 15.
Figures 17, 18:
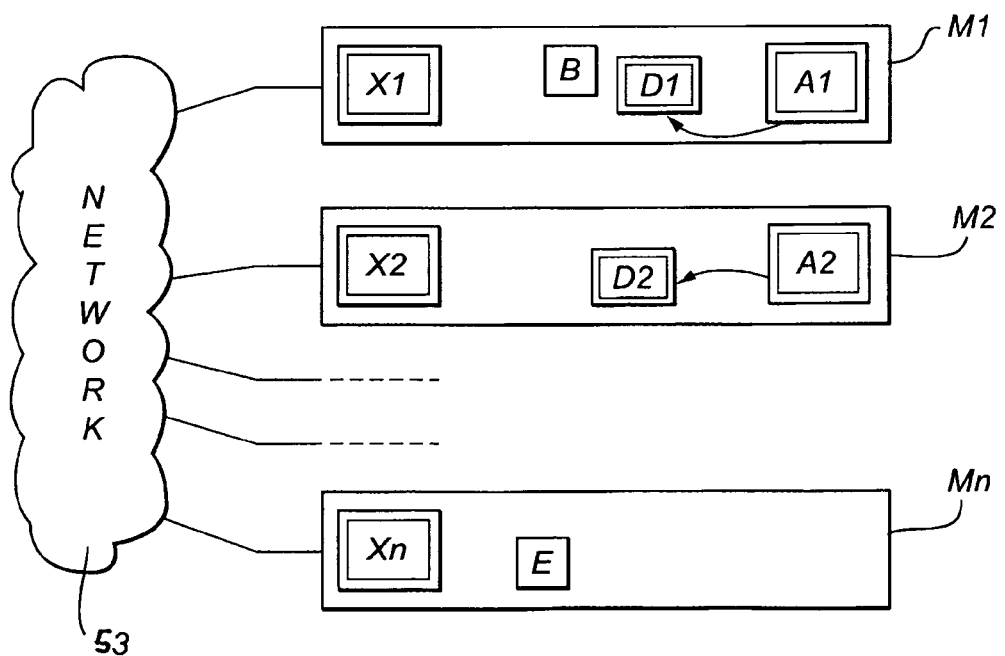
FIG. 18 illustrates another memory change, FIGS. 19 and 20 respectively illustrate the single and multiple reachability tables corresponding to the memory changes of FIG. 19.

A further example is illustrated in FIG. 15. Here an object designated A1 and A2 is shared on machines M1 and M2 but is not present on machine Mn. This is indicated in the table entries for object A in FIGS. 16 and 17 which respectively show the single reachability table utilised by the server machine X or the multiple reachability tables utilised by the individual machines. As illustrated in FIG. 18, machine M2 during processing of the applications program assigns a reference of object D to object A. As a consequence, the DRT 71/2 examines the table entries for objects D and A on machine M2. This interrogation of the table determines that the table entry for object D does not include all machines in the set of machines listed in the table entry for object A. Therefore, the table entry for object D on machine M2 is updated to include the machines of the table entry for object A not already present in the table entry for object D, which in this instance is the additional machine M1. In accordance with this operation, machine M2 instructs machine M1 to create a table entry for object D consisting of the machines listed in the now updated table entry for object D on machine M2, and create a local replica of object D. The resultant changes for a single reachability table, and for multiple reachability tables, are illustrated in FIGS. 19 and 20 respectively.

Figures 21, 22:
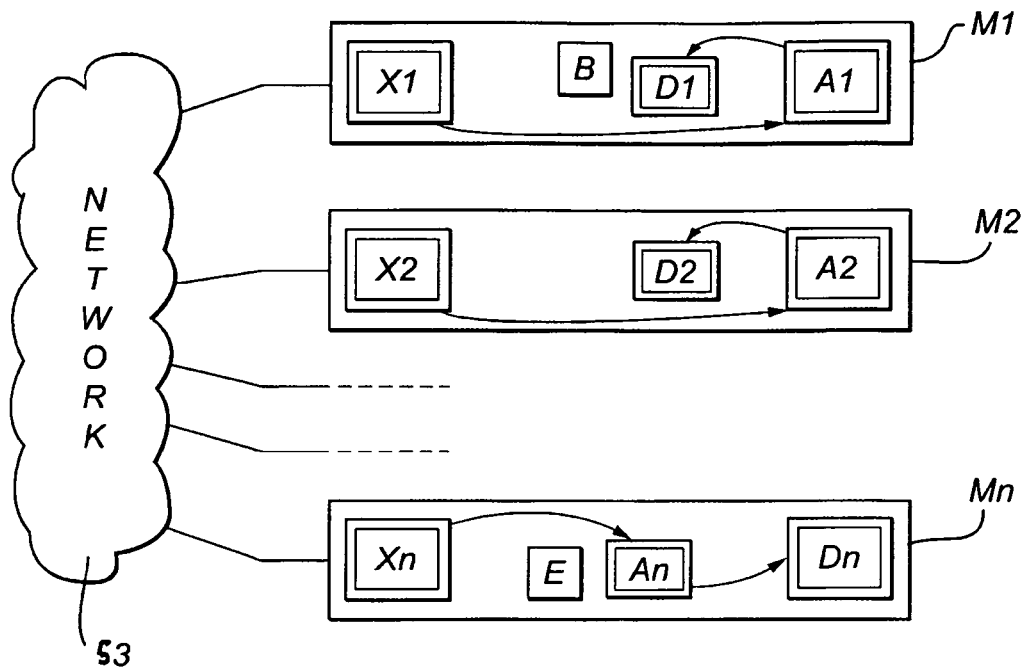
FIG. 21 illustrates a still further memory change, FIGS. 22 and 23 respectively illustrate the single and multiple reachability tables corresponding to the memory changes of FIG. 21.

A further example is illustrated in FIG. 21 in which the addition of a reference to object A assigned to class X is executed by machine M1. As a consequence, the tables for class X and object A are consulted to determine if object A is changing its reachability state. If the table entries for object A include all machines in the table entry for class X, then no additional action is taken. If, however, as is the case in FIG. 21 class X includes machines in its table entry not included in the table entry for object A, then a reachability change is taking place. In accordance with this change, machine M1 updates the entry for class X. Furthermore, machine M1 instructs all other machines to add and/or update their table entry for object A to be the same as the now updated table entry for object A on machine M1. In accordance with this operation, any machine which was not already present in the table entry for object A is instructed to add that table entry for object A and create a replica in local memory of object A (which in this instance it is only required in machine Mn). However, machine M1 also knows that object A in turn references object D, and so object D has to inherit the reachability change of object A. Consequently, the table entry for object D is updated to include all machines listed in the now updated table entry of object A.

In addition to the above, machine M1 also instructs all machines not previously included in the table entry of object D (which in this instance is only machine Mn), to add a table entry for object D with a value equal to the now updated table entry value on machine M1, and create a replica in local memory of object D. Furthermore, machine M1 instructs all other machines (which in this instance is only machine M2) to update the table entry for object D with the new table entry value updated on machine M1. The single reachability table and multiple reachability tables which reflect these changes are illustrated in FIGS. 22 and 23 respectively.

Figures 23, 24:
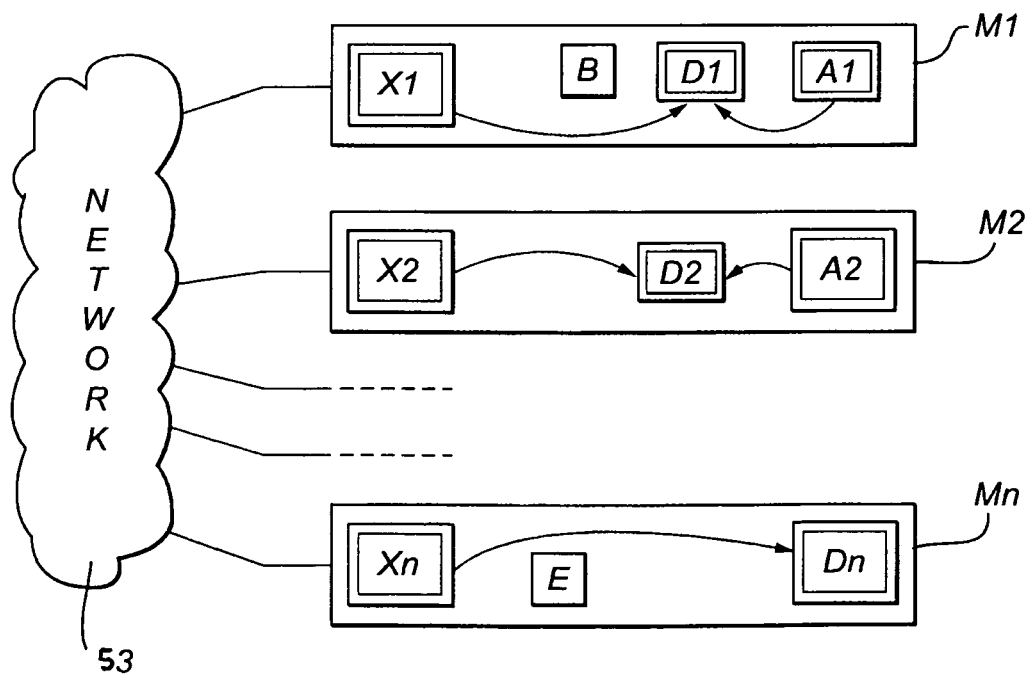
FIG. 24 illustrates yet another memory change, and FIGS. 25 and 26 respectively illustrate the single and multiple reachability tables corresponding to the memory changes of FIG. 24.

Turning now to FIG. 24, the position illustrated in FIG. 18 is modified by class X of machine M1 being assigned a reference to object D. In association with this event, the reachability tables of object D and class X are examined by the DRT 71/1 for the possibility of a reachability change having occurred. Consequently, the table entries for object D and class X are compared and if the table entry for object D includes all machines listed in the table entry of class X, then no additional action is required to be taken. Alternatively, if the table entry for object D does not include all machines listed in the table entry for class X then a reachability change has taken place and consequential action is required.

As indicated in FIG. 24, machine M1 determines that object D has undergone a reachability change. Consequently, machine M1 firstly updates its table entry for object D to include all machines in the table entry for class X. For each new machine not previously in the set of machines of the table entry for object D, machine M1 instructs each such machine to add a local table entry for object D equal to the now updated machine entry for object D on machine M1, and create a replica in local memory of object D. For each other machine, machine M1 also instructs the other machine to update its table entry for object D to be equal to the table entry for object D in machine M1. The single reachability table and multiple reachability tables which reflect these changes are respectively illustrated in FIGS. 25 and 26.

The foregoing describes only some embodiments of the present invention and modifications, obvious to those skilled in the art, can be made thereto without departing from the scope of the present invention. For example, the tables of FIGS. 4, 6, 8 and 10 all show a row corresponding to each memory location. In practice, for those memory locations such as D and E which are only accessible by their local machine, it is not necessary to have a row in the table at all. Instead, such a row is only created if the memory location becomes accessible by one or more other machines. Similarly, reference to JAVA includes both the JAVA language and also JAVA platform and architecture.

In all described instances of modification, where the application code 50 is modified before, or during loading, or even after loading but before execution of the unmodified application code has commenced, it is to be understood that the modified application code is loaded in place of, and executed in place of, the unmodified application code subsequently to the modifications being performed.

Alternatively, in the instances where modification takes place after loading and after execution of the unmodified application code has commenced, it is to be understood that the unmodified application code may either be replaced with the modified application code in whole, corresponding to the modifications being performed, or alternatively, the unmodified application code may be replaced in part or incrementally as the modifications are performed incrementally on the executing unmodified application code. Regardless of which such modification routes are used, the modifications subsequent to being performed execute in place of the unmodified application code.

It is advantageous to use a global identifier is as a form of 'meta-name' or 'meta-identity' for all the similar equivalent local objects (or classes, or assets or resources or the like) on each one of the plurality of machines M1, M2 ... Mn. For example, rather than having to keep track of each unique local name or identity of each similar equivalent local object on each machine of the plurality of similar equivalent objects, one may instead define or use a global name corresponding to the plurality of similar equivalent objects on each machine (e.g. "globalname7787"), and with the understanding that each machine relates the global name to a specific local name or object (e.g. "globalname7787" corresponds to object "localobject456" on machine M1, and "globalname7787" corresponds to object "localobject885" on machine M2, and "globalname7787" corresponds to object "localobject111" on machine M3, and so forth).

It will also be apparent to those skilled in the art in light of the detailed description provided herein that in a table or list or other data structure created by each DRT 71 when initially recording or creating the list of all, or some subset of all objects (e.g. memory locations or fields), for each such recorded object on each machine M1, M2 ... Mn there is a name or identity which is common or similar on each of the machines M1, M2 ... Mn. However, in the individual machines the local object corresponding to a given name or identity will or may vary over time since each machine may, and generally will, store memory values or contents at different memory locations according to its own internal processes. Thus the table, or list, or other data structure in each of the DRTs will have, in general, different local memory locations corresponding to a single memory name or identity, but each global "memory name" or identity will have the same "memory value or content" stored in the different local memory locations. So for each global name there will be a family of corresponding independent local memory locations with one family member in each of the computers. Although the local memory name may differ, the asset, object, location etc has essentially the same content or value. So the family is coherent.

The term "table" or "tabulation" as used herein is intended to embrace any list or organised data structure of whatever format and within which data can be stored and read out in an ordered fashion.

It will also be apparent to those skilled in the art in light of the description provided herein that the abovementioned modification of the application program code 50 during loading can be accomplished in many ways or by a variety of means. These ways or means include, but are not limited to at least the following five ways and variations or combinations of these five, including by:
  (i) re-compilation at loading,
  (ii) a pre-compilation procedure prior to loading,
  (iii) compilation prior to loading,
  (iv) "just-in-time" compilation(s), or
  (v) re-compilation after loading (but, for example, before execution of the relevant or corresponding application code in a distributed environment).

Traditionally the term "compilation" implies a change in code or language, for example, from source to object code or one language to another. Clearly the use of the term "compilation" (and its grammatical equivalents) in the present specification is not so restricted and can also include or embrace modifications within the same code or language.

Those skilled in the computer and/or programming arts will be aware that when additional code or instructions is/are inserted into an existing code or instruction set to modify same, the existing code or instruction set may well require further modification (such as for example, by re-numbering of sequential instructions) so that offsets, branching, attributes, mark up and the like are properly handled or catered for.

Similarly, in the JAVA language memory locations include, for example, both fields and array types. The above description deals with fields and the changes required for array types are essentially the same mutatis mutandis. Also the present invention is equally applicable to similar programming languages (including procedural, declarative and object orientated languages) to JAVA including Microsoft.NET platform and architecture (Visual Basic, Visual C/C++, and C#) FORTRAN, C/C++, COBOL, BASIC etc.

The terms object and class used herein are derived from the JAVA environment and are intended to embrace similar terms derived from different environments such as dynamically linked libraries (DLL), or object code packages, or function unit or memory locations.

Various means are described relative to embodiments of the invention, including for example but not limited to lock means, distributed run time means, modifier or modifying means, and the like. In at least one embodiment of the invention, any one or each of these various means may be implemented by computer program code statements or instructions (possibly including by a plurality of computer program code statements or instructions) that execute within computer logic circuits, processors, ASICs, logic or electronic circuit hardware, microprocessors, microcontrollers or other logic to modify the operation of such logic or circuits to accomplish the recited operation or function. In another embodiment, any one or each of these various means may be implemented in firmware and in other embodiments such may be implemented in hardware. Furthermore, in at least one embodiment of the invention, any one or each of these various means may be implemented by a combination of computer program software, firmware, and/or hardware.

Any and each of the abovedescribed methods, procedures, and/or routines may advantageously be implemented as a computer program and/or computer program product stored on any tangible media or existing in electronic, signal, or digital form. Such computer program or computer program products comprising instructions separately and/or organized as modules, programs, subroutines, or in any other way for execution in processing logic such as in a processor or microprocessor of a computer, computing machine, or information appliance; the computer program or computer program products modifying the operation of the computer in which it executes or on a computer coupled with, connected to, or otherwise in signal communications with the computer on which the computer program or computer program product is present or executing. Such a computer program or computer program product modifies the operation and architectural structure of the computer, computing machine, and/or information appliance to alter the technical operation of the computer and realize the technical effects described herein.

The invention may therefore include a computer program product comprising a set of program instructions stored in a storage medium or existing electronically in any form and operable to permit a plurality of computers to carry out any of the methods, procedures, routines, or the like as described herein including in any of the claims.

Furthermore, the invention includes (but is not limited to) a plurality of computers, or a single computer adapted to interact with a plurality of computers, interconnected via a communication network or other communications link or path and each operable to substantially simultaneously or concurrently execute the same or a different portion of an application code written to operate on only a single computer on a corresponding different one of computers. The computers are programmed to carry out any of the methods, procedures, or routines described in the specification or set forth in any of the claims, on being loaded with a computer program product or upon subsequent instruction. Similarly, the invention also includes within its scope a single computer arranged to co-operate with like, or substantially similar, computers to form a multiple computer system To summarise, there is provided a method of selecting independent memory locations to be substantially simultaneously updated in a multiple computer environment in which different portions of at least one application program written to execute on only a single computer are executed substantially simultaneously each on a corresponding different one of the multiple computers, the method comprising the steps of:

(i) selecting a first group of memory locations each of which is replicated on each the computer, (ii) ignoring a second group of memory locations each of which is present only in the specific one of the computers in which each the second group memory location is physically located, (iii) promoting from the second group any memory location to which a memory location in the first group begins to refer, (iv) replicating the promoted second group location in all other ones of the computers other than the one in which it was physically located when in the second group, (v) assigning the replicated promoted second group locations to the first group, and (vi) substantially simultaneously updating the first group locations of the other ones of the computers with any changes made to a first group location of any one of the computers.

Preferably, the method includes the further step of:

(vii) promoting from the second group of memory locations any memory location or locations to which a promoted second group memory location itself refers, whereby a memory location referred to by a promoted memory location inherits the promotion of its referring memory location.

Preferably, the method includes the further step of:

(viii) maintaining a table listing the first group of memory locations.

Preferably, the method includes the further step of:

(ix) maintaining one the table for all the multiple computers on a further server computer.

Alternatively, the method includes the further step of:

(x) maintaining multiple the tables one in each of the multiple computers.

Preferably, the memory locations includes an asset, structure or resource.

A multiple computer system in which different portions of at least one application program written to execute on only a single computer execute substantially simultaneously each on a corresponding different one of a plurality of computers, each of which has an independent local memory and all of which are interconnected by a communications network, wherein memory locations present in the local memories are categorized into two groups, a first group of memory locations each of which is replicated on each the computer, and a second group of memory locations each of which is present only in the specific one of the computers in which each the second group memory location is physically present, the system comprising memory updating means to update via the communications network any changes made to a memory location of the first group in one computer to all other corresponding memory locations of the other computers, and promotion means to promote from the second group to the first group any memory location of the second group which, as a result of execution of the application program, is now referred top by a memory location of the first group.

Preferably, the promotion means includes an inheritance means operable to promote from the second group of memory locations any memory location or locations to which a promoted second group memory location itself refers.

Preferably, the promotion means includes a table listing the first group of memory locations.

Preferably, the system has one table for all the plurality of application program executing computers present in a further server computer.

Alternatively, the system has a plurality of tables, one in each of the plurality of application program executing computers.

Preferably, the memory locations include an asset, structure or resource.

Further, there is provided a computer program product comprising a set of program instructions stored in a storage medium and operable to permit a plurality of computers to carry out any of the above method(s).

Similarly, there is provided a plurality of computers interconnected via a communications network and operable to ensure carrying out of any of the above method(s).

Further, there is also provided a single computer adapted to co-operate with at least one other computer in order to carry out any of the above method(s) or form the above computer system(s).

The term "compromising" (and its grammatical variations) as used herein is used in the inclusive sense of "having" or "including" and not in the exclusive sense of "consisting only of".

The invention claimed is:

1. In a multiple computer system comprising a plurality of computers, each including a local processor and a local memory coupled with a respective local processor, and including a first computer and a second computer interconnected via a communications link or network operating in a replicated shared memory arrangement, a method of classifying said local memories comprising:
   classifying said local memories into a first category of memory locations each of which is replicated on two or more computers of said plurality of computers;
   classifying said local memories into a second category of memory locations each of which is present only in a specific one of said plurality of computers in which each said second category of memory location is physically located; and
   maintaining a replication table listing or recording the ones of said computers on which a said first category memory location is replicated.

2. A method as in claim 1, further including:
   a. maintaining a first table listing or recording said first category memory locations.

3. A method as in claim 2, further including:
   a. maintaining a second table listing or recording said second category memory locations.

4. A method as in claim 2, further including:
   a. not maintaining a table listing or recording said second category memory locations.

5. A method as in claim 3, wherein said replication table and either or both of, said table of said first category memory locations and said table of said second category memory locations, are a single or the same table.

6. A method as in claim 3, further comprising:
   a. updating said table of said first category memory locations on each one of said computers, to include promoted second category memory locations.

7. A method as in claim 1, further including:
   a. maintaining a first table listing or recording said first category memory locations;
   b. maintaining a second table listing or recording said second category memory locations; and
   c. said first table and said second table are the same table or are different tables.

8. A method as in claim 1, further including:
   a. maintaining at least one of a first table listing or recording said first category memory locations, and a second table listing or recording said second category memory locations, on a further server computer.

9. A method as in claim 1, further including:
   a. maintaining multiple ones of a first table listing or recording said first category memory locations, and a second table listing or recording said second category memory locations, at least one in each of said plurality of computers.

10. A method as in claim 1, wherein said first category memory locations of one of said computers do not access or refer to any second category memory locations of the same computer.

11. A method as in claim 10, wherein said access includes memory addresses of said second category memory locations.

12. A method as in claim 10, wherein said access includes pointers, references, handles, or links to or of said second category memory locations.

13. A method as in claim 1, wherein said first and second category memory locations comprise an object or objects.

14. A method as in claim 1, wherein said first and second category memory locations comprise a class or classes.

15. A method as in claim 1, wherein said first and second category memory locations comprise object field(s) or class field(s).

16. A method as in claim 1, wherein said first and second category memory locations comprise data structure(s).

17. A method as in claim 1, wherein said first and second category memory locations comprise array data structure(s).

18. A method as in claim 1, wherein said first and second category memory locations comprise elements of array data structure(s).

19. A method as in claim 1, wherein said first and second category memory locations comprise libraries, linked libraries, and/or dynamically linked libraries.

20. A method as in claim 1, further comprising:
   a. maintaining one said replication table for each said first category memory location.

21. A method as in claim 1, further comprising:
   a. maintaining one said replication table for a plurality of first category memory locations.

22. A method as in claim 21, further including:
   a. maintaining at least one said replication table for each plurality of first category memory locations of possible multiple pluralities.

23. A method as in claim 21, wherein said plurality of first category memory locations are plural memory locations of a related set of memory locations.

24. A method as in claim 23, wherein said related set of memory locations are an array of memory locations.

25. A method as in claim 23, wherein said array of memory locations comprise an array data structure.

26. A method as in claim 23, wherein said related set of memory locations are memory locations of an object or class.

27. A method as in claim 26, wherein said memory locations of an object or class are object fields or variables, or class fields or variables.

28. A method as in claim 1, further comprising:
a. maintaining multiple said replication tables, one in each of said computers.

29. A method as in claim 1, further comprising:
a. maintaining multiple said replication tables in each of said computers.

30. A method as in claim 1, further comprising:
a. maintaining one said replication table, for all said computers on a further server computer.

31. A method as in claim 1, further comprising:
following any changes made to a first category memory location of any one of said computers, substantially simultaneously updating said first category memory locations of the other computers that are replicas of the changed first category memory location.

32. A method as in claim 31, further comprising:
utilizing a replication table or tables to determine which ones of said multiple computers are to be said substantially simultaneously updated.

33. A method as in claim 31, further comprising:
following any changes made to a second category memory location of any one of said computers, not updating said second category memory locations of the other computers.

34. A method as in claim 31, wherein said substantially simultaneous updating comprises:
updating said first category memory locations of the other computers on which said changed first category memory location is replicated, with any changes made to said changed first category memory location of said any computers.

35. A method as in claim 31, wherein said substantially simultaneous updating excludes updating said first category memory locations of any computers on which said changed first category memory locations location is not replicated.

36. A method as in claim 35, further including:
a. promoting any said second category memory locations to which a said first category memory location begins to access or refer.

37. A method as in claim 31, wherein:
at least one of memory locations and/or a memory value of an application program operating in said multiple computer system is substantially similarly replicated in said local memories of said different ones of said plurality of computers; and
said substantially similarly replicated memory location and/or memory value are updated in due course to remain substantially similar upon occasion of any one of said computers simultaneously operating said application program modifying, or causing to be modified, the value or content(s) of said at least one substantially similarly replicated memory location and/or memory value.

38. A method as in claim 31, further comprising:
maintaining a listing or recording in a replication table or tables of the ones of said computers on which a said first category memory location is replicated;
substantially simultaneously updating said first category memory locations of the other ones of said computers in the listing or recording with any changes made to a first category memory location of any one of said computers in the listing or recording;
promoting any said second category memory locations to which a said first category memory location begins to access or refer;
wherein said promoting includes updating said replication table or tables of said replicated first category memory location to include promoted second category memory locations,
replicating existing first category memory locations to which other first category memory locations begin to access or refer, where said other first category memory locations are replicated in additional computers in which said existing first category memory locations are not replicated, so as to replicate said existing first category memory locations to/in all said additional computers;
updating said replication table or tables of said replicated first category memory location on each one of said computers in which said existing first category memory locations are replicated, to include said existing first category memory locations;
updating said replication table or tables to include (or list or record) said additional computers on which said existing first category memory locations are replicated;
not executing (or performing) initialization routines (or operations) of promoted second category memory locations upon said replicating of said existing first category memory locations; and
modifying an application program before, during, or after loading by inserting one or more disable initialization operations, in order to not execute initialization routines.

39. A method as in claim 1, further including:
a. promoting any said second category memory locations to which a said first category memory location begins to access or refer.

40. A method as in claim 39, further including:
a. promoting any said second category memory locations to which said promoted second category memory location accesses or refers.

41. A method as in claim 40, further comprising:
repeating the step of promoting any said second category memory locations to which a promoted second category memory location accesses or refers, for each promoted second category memory location.

42. A method as in claim 39, wherein said access includes memory addresses of promoted second category memory locations.

43. A method as in claim 39, wherein said access includes pointers, references, handles, or links to or of promoted second category memory locations.

44. A method as in claim 39, further comprising:
replicating promoted second category memory locations to or in all other ones of said plurality of computers.

45. A method as in claim 44, wherein promoted second category memory locations need not be replicated to any computer in which promoted second category memory locations were physically located when in said second category.

46. A method as in claim 44, wherein said replicating of promoted second category memory locations to/in other computers exclude computers in which promoted second category memory locations were physically located when in said second category.

47. A method as in claim 39, further comprising:
replicating promoted second category memory locations to or in any other computers in which said accessing or referring first category memory location is replicated.

48. A method as in claim 39, wherein said promoting includes assigning promoted second category memory locations to said first category memory locations.

49. A method as in claim 48, wherein said promoting includes re-classifying promoted second category memory locations to become first category memory locations.

50. A method as in claim 48, wherein said promoting includes updating said table of said first category memory locations to include promoted second category memory locations.

51. A method as in claim 48, wherein said promoting includes updating said table of said second category memory locations to exclude promoted second category memory locations.

52. A method as in claim 39, wherein said promoting includes assigning promoted second category memory locations to said first category memory locations on computers in which promoted second category memory locations were physically located when in said second category.

53. A method as in claim 39, further including:
 a. updating a table of said first category memory locations on each computer in which promoted second category memory locations are replicated, to include promoted second category memory locations.

54. A method as in claim 53, further including:
 not updating a table or tables of said first category memory locations on each computers in which promoted second category memory locations are not replicated, to include promoted second category memory locations.

55. A method as in claim 39, wherein said promoting includes updating table or tables to include promoted second category memory locations.

56. A method as in claim 55, further comprising:
 updating said table or tables to include the computers on which promoted second category memory locations are replicated.

57. A method as in claim 56, further comprising:
 updating replication table(s) on each one of said computers.

58. A method as in claim 56, further comprising:
 a. updating said table or tables on each computer in which promoted second category memory locations are replicated.

59. A method as in claim 58, further comprising:
 not updating said table or tables on each computer in which a promoted second category memory location is not replicated.

60. A method as in claim 59, further comprising:
 replicating existing first category memory locations to which other first category memory locations begin to access or refer, where said other first category memory locations are replicated in additional ones of said computers which said existing first category memory locations are not replicated, so as to replicate said existing first category memory locations to/in all said additional computers.

61. A method as in claim 39, further comprising:
 not executing initialization routines of promoted second category memory locations following promotion.

62. A method as in claim 61, further comprising:
 modifying an application program before, during, or after loading by inserting one or more disable initialization operations, in order to effect disabling initialization.

63. A method as in claim 62, wherein said application program is modified in accordance with a procedure from a group of procedures consisting of re-compilation at loading, pre-compilation at loading, compilation prior to loading, just-in-time compilation, re-compilation after loading but before execution of a relevant portion of the application program, and re-compilation after execution of the relevant portion of the application program has commenced.

64. A method as in claim 63, wherein said modified application program operates on each computer.

65. A method as in claim 64, wherein said modified application program is transferred from a first computer to all other computers, and loaded by said other computers upon receipt or thereafter.

66. A method as in claim 39, further comprising:
 not executing (or performing) initialization routines (or operations) of promoted second category memory locations following promotion, by all other computers.

67. A method as in claim 39, further comprising:
 not executing (or performing) initialization routines (or operations) of promoted second category memory locations following promotion, by all computers in which promoted second category memory locations are replicated.

68. A method as in claim 39, further comprising:
 disabling initialization of promoted second category memory locations.

69. A method as in claim 68, wherein said disabling initialization takes place upon said promotion.

70. A method as in claim 68, wherein said disabling initialization includes disabling execution or operation of initialization routines.

71. A method as in claim 68, wherein disabled initialization routines are associated with promoted second category memory locations.

72. A method as in claim 71, wherein said associated initialization routines are object initialization routines or class initialization routines.

73. A method as in claim 72, wherein promoted second category memory locations are objects or classes.

74. A method as in claim 68, further comprising only initializing memory locations of said second category memory locations.

75. A method as in claim 74, further including: only executing initialization routines of said second category memory locations.

76. A method as in claim 39, further comprising:
 Disabling initialization of promoted second category memory locations, by all other computers.

77. A method as in claim 39, further comprising:
 disabling initialization of promoted second category memory locations, by all other computers in which promoted second category memory locations are replicated.

78. A method as in claim 1, further including:
 replicating existing first category memory locations to which other first category memory locations begin to access or refer, where said other first category memory locations are replicated in additional ones of said computers in which said existing first category memory locations are not replicated, so as to replicate said existing first category memory locations to/in all said additional computers.

79. A method as in claim 78, further comprising:
 replicating further existing first category memory locations to which a said existing first category memory location accesses or refers.

80. A method as in claim 79, further comprising:
 repeating, the replicating further existing first category memory locations to which a said existing first category memory location accesses or refers, for each replicated said existing first category memory location.

81. A method as in claim 80, wherein said access includes memory addresses of said existing first category memory locations.

82. A method as in claim 80, wherein said access includes pointers, references, handles, or links to or of said existing first category memory locations.

83. A method as in claim 80, wherein said existing first category memory locations need not be replicated to computers in which said existing first category memory locations are already replicated.

84. A method as in claim 80, wherein said replicating of said existing second category memory locations to/in other computers exclude computers in which said existing first category memory locations are already replicated.

85. A method as in claim 78, further comprising:
   a. updating a table or tables of said first category memory locations on each computer in which said existing first category memory locations are replicated, to include said existing first category memory locations.

86. A method as in claim 85, wherein said updating of said table or tables of said first category memory locations on each computers in which said existing first category memory locations are replicated, includes said additional computers.

87. A method as in claim 86, further comprising:
   not updating said table or tables of said first category memory locations on each computer in which said existing first category memory locations are not replicated, to include said existing first category memory locations.

88. A method as in claim 78, further comprising:
   updating a table or tables to include said additional computers on which said existing first category memory locations are replicated.

89. A method as in claim 88, further comprising:
   updating a table or tables on each computer.

90. A method as in claim 88, further comprising:
   updating a table or tables on each computer in which said existing first category memory locations are replicated.

91. A method as in claim 90, further comprising:
   not updating a table or tables on each computer in which a promoted second category memory locations is not replicated.

92. In a multiple computer system comprising a plurality of computers, each including a local processor and a local memory coupled with a respective local processor, and including a first computer and a second computer interconnected via a communications link or network operating in a replicated shared memory arrangement, a method of classifying said local memories comprising:
   classifying said local memories into a first category of memory locations each of which is replicated on two or more computers of said plurality of computers;
   classifying said local memories into a second category of memory locations each of which is present only in a specific one of said plurality of computers in which each said second category of memory location is physically located;
   maintaining a listing or recording in a replication table of the ones of said computers on which a said first category memory location is replicated;
   substantially simultaneously updating said replicated first category memory locations of the other computers with any changes made to said replicated first category memory location of any computer;
   promoting any said second category memory locations to which a said first category memory location begins to access or refer;
   replicating existing first category memory locations to which other first category memory locations begin to access or refer, where said other first category memory locations are replicated in additional computers which said existing first category memory locations are not replicated, so as to replicate said existing first category memory locations to/in all said additional computers;
   updating a table of said first category memory locations on each one of said computers in which said existing first category memory locations are replicated, to include said existing first category memory locations;
   updating said replication table to include (or list or record) the said additional computers on which said existing first category memory locations are replicated;
   not executing (or performing) initialization routines (or operations) of promoted second category memory locations upon said replicating of said existing first category memory locations; and
   modifying an application program before, during, or after loading by inserting one or more disable initialization operations; and
   wherein said promoting includes updating said table to include promoted second category memory locations.

93. A method as in claim 92, wherein said local memories of each computer are independent of each other.

94. A method as in claim 93, wherein each of said local processors may only access said local memory of the same computer in which each local processor is located.

95. A method as in claim 92, wherein at least a first application program written to operate on a single one of said computers, is operating substantially simultaneously on different computers.

96. A method as in claim 95, wherein said application program operating substantially simultaneously on each of said different computers, may only access said local memory of a same computer.

97. A method as in claim 96, wherein said access is satisfied by said local memory of the same computer independently of (or without the aid of) said local memory of any other computer.

98. A method as in claim 97, wherein said access includes reading and/or writing content or values stored or resident within said local memory of a same computer.

99. A method as in claim 97, wherein said access is restricted to reading and/or writing content or values stored or resident within said local memory of a same computer.

100. A method as in claim 97, wherein said access includes reading and/or writing content or values of real or virtual memory addresses of or resident within said local memory of a same computer.

101. A method as in claim 97, wherein said access is restricted to reading and/or writing content or values of real or virtual memory addresses of or resident within said local memory of a same computer.

102. A method as in claim 101, wherein substantially similarly replicated memory location(s) and/or memory value(s) are updated through in-due-course updating to remain substantially similar upon occasion of any one of said different computers simultaneously operating said application program modifying, or causing to be modified, the value(s) of a substantially similarly replicated memory location(s) and/or memory value(s).

103. A method as in claim 102, wherein each said substantially similarly replicated memory location(s) and/or value(s) of each computer is identified with a substantially similar identifier.

104. A method as in claim 102, wherein said in-due-course updating provides that said substantially similarly replicated memory location(s) are updated to remain substantially similar upon occasion of any computers simultaneously operating said application program causing modification of the value(s) of said substantially similarly replicated memory location(s).

105. A method as in claim 96, wherein said access includes reading and/or writing content or values stored or resident within said local memory of a same computer.

106. A method as in claim 105, wherein said access includes reading and/or writing content or values of real or virtual memory addresses of or resident within said local memory of a same computer.

107. A method as in claim 105, wherein said access is restricted to reading and/or writing content or values of real or virtual memory addresses of or resident within said local memory of a same computer.

108. A method as in claim 96, wherein said access is restricted to reading and/or writing content or values stored or resident within said local memory of a same computer.

109. A method as in claim 96, wherein said access includes reading and/or writing content or values of real or virtual memory addresses of or resident within said local memory of a same computer.

110. A method as in claim 96, wherein said access is restricted to reading and/or writing content or values of real or virtual memory addresses of or resident within said local memory of a same computer.

111. A method as in claim 110, wherein substantially similarly replicated memory location(s) and/or value(s) are stored non-identically in local memories of different computers.

112. A method as in claim 96, wherein at least one memory location and/or memory value of said application program is substantially similarly replicated in said local memories of said different computers.

113. A method as in claim 92, wherein:
said local memory of each computer are independent of each other;
each of said local processors may only access said local memory of the same computer in which each local processor is located;
at least a first application program written to operate on a single computer, is operating substantially simultaneously on different ones of said computers;
said application program operating substantially simultaneously on each of said different ones of said computers, may only access said local memory of a same computer;
said access is satisfied by said local memory of the same computer independently of (or without the aid of) said local memory of any other computer;
said access includes reading and/or writing content or values stored or resident within said local memory of the same computer, or said access is restricted to reading and/or writing content or values stored or resident within said local memory of the same computer;
said access includes reading and/or writing content or values of real or virtual memory addresses of or resident within said local memory of the same computer, or said access is restricted to reading and/or writing content or values of real or virtual memory addresses of or resident within said local memory of the same computer;
at least one memory location and/or memory value of said application program is substantially similarly replicated in said local memories of said different ones of said computers;
said at least one substantially similarly replicated memory location and/or value is stored non-identically in said local memories of said different ones of said computers;
said at least one substantially similarly replicated memory location and/or memory value are updated through in-due-course updating to remain substantially similarly upon occasion of any one computer simultaneously operating said application program modifying, or causing to be modified, the value of said at least one substantially similarly replicated memory location and/or memory value;
said in-due-course updating provides that said at least one replicated memory location is updated to remain substantially similar upon occasion of any computer simultaneously operating said application program causing modification of the value of said at least one substantially similarly replicated memory location; and
wherein each said at least one substantially similarly replicated memory location and/or value of each of the said computers is identified with a substantially similar identifier.

114. A computer program stored on a computer readable memory device comprising instructions which, when executed on a computer, perform in at least one single computer capable of interoperating with said at least one other computer coupled to at least one single computer at least intermittently via a communications network to form a multiple computer system having a plurality of computers wherein each computer has a local memory and the multiple computer system operating in a replicated shared memory arrangement, a method of classifying said local memories comprising:
classifying each said local memory into a first category of memory locations each of which is replicated on two or more computers of said plurality of computers;
classifying each said local memory into a second category of memory locations each of which is present only in a specific one of said plurality of computers in which each said second category of memory location is physically located; and
maintaining a replication table listing or recording the ones of said computers on which one or more of said first category memory locations are replicated.

115. A multiple computer system comprising:
a plurality of computers, each including a local processor and a local memory coupled with a respective local processor, and including a first computer and a second computer interconnected via a communications link or network operating in a replicated shared memory arrangement;
means for classifying said local memories into a first category of memory locations each of which is replicated on two or more computers of said plurality of computers;
means for classifying said local memories into a second category of memory locations each of which is present only in a specific one of said plurality of computers in which each said second category of memory location is physically located; and
maintaining a replication table listing or recording the ones of said computers on which one or more of said first category memory locations are replicated.

\* \* \* \* \*